(12) United States Patent
Scotto et al.

(10) Patent No.: US 10,204,354 B2
(45) Date of Patent: Feb. 12, 2019

(54) SYSTEM, METHOD AND APPARATUS FOR MANAGING MADE-TO-ORDER FOOD TICKETS FOR A RESTAURANT SERVICE

(71) Applicant: GrubHub Holdings Inc., Chicago, IL (US)

(72) Inventors: Stefano Alexander Scotto, Chicago, IL (US); Jacob Lyman Battle, Skokie, IL (US); Joshua Evnin, Chicago, IL (US); Zach Danielson, Chicago, IL (US); Kristie Adams, Chicago, IL (US); Matthew Maloney, Chicago, IL (US)

(73) Assignee: GRUBHUB HOLDINGS INC., Chicago, IL (US)

(*) Notice: Subject to any disclaimer, the term of this patent is extended or adjusted under 35 U.S.C. 154(b) by 768 days.

(21) Appl. No.: 14/639,715

(22) Filed: Mar. 5, 2015

(65) Prior Publication Data
US 2015/0186916 A1    Jul. 2, 2015

Related U.S. Application Data

(62) Division of application No. 13/743,009, filed on Jan. 16, 2013, now Pat. No. 9,009,067.

(51) Int. Cl.
| | |
|---|---|
| *G06Q 30/00* | (2012.01) |
| *G06Q 30/02* | (2012.01) |
| *G06Q 50/12* | (2012.01) |
| *G06Q 30/06* | (2012.01) |
| *G06Q 50/00* | (2012.01) |
| *G06Q 40/00* | (2012.01) |
| *G06Q 20/00* | (2012.01) |

(52) U.S. Cl.
CPC ..... *G06Q 30/0226* (2013.01); *G06Q 30/0207* (2013.01); *G06Q 30/0635* (2013.01); *G06Q 50/12* (2013.01)

(58) Field of Classification Search
USPC ........................................................ 705/15
See application file for complete search history.

(56) References Cited

U.S. PATENT DOCUMENTS

| | | |
|---|---|---|
| 4,530,067 A | 7/1985 | Dorr |
| 4,547,851 A | 10/1985 | Kurland |
| 5,189,411 A | 2/1993 | Collar |

(Continued)

FOREIGN PATENT DOCUMENTS

| | | |
|---|---|---|
| EP | 0 844 579 A2 | 5/1998 |
| EP | 0 856 812 A2 | 5/1998 |

(Continued)

OTHER PUBLICATIONS

U.S. Appl. No. 60/131,119, filed Apr. 27, 1999, Robert Showghi.

(Continued)

*Primary Examiner* — Ashford S Hayles
(74) *Attorney, Agent, or Firm* — Hickman Palermo Becker Bingham LLP

(57) ABSTRACT

A customer service system operated by a restaurant service provides a restaurant service server. From a database, the restaurant service server retrieves a ticket that is generated by a restaurant service server application. The restaurant service server applies a diner credit policy to the ticket, and issues a diner credit for the diner associated with the ticket.

10 Claims, 19 Drawing Sheets

(56) References Cited

U.S. PATENT DOCUMENTS

| | | |
|---|---|---|
| 5,272,474 A | 12/1993 | Hilliard |
| 5,367,557 A | 11/1994 | Ozenbaugh |
| 5,510,979 A | 4/1996 | Moderi |
| 5,570,283 A | 10/1996 | Shoolery |
| 5,745,681 A | 4/1998 | Levine |
| 5,751,958 A | 5/1998 | Zweben |
| 5,774,670 A | 6/1998 | Montulli |
| 5,781,189 A | 7/1998 | Holleran |
| 5,835,896 A | 11/1998 | Fisher |
| 5,838,798 A | 11/1998 | Stevens |
| 5,839,115 A | 11/1998 | Coleman |
| 5,842,176 A | 11/1998 | Hunt |
| 5,845,263 A | 12/1998 | Camaisa |
| 5,850,214 A | 12/1998 | McNally |
| 5,912,743 A | 6/1999 | Kinebuchi |
| 5,948,040 A | 9/1999 | DeLorme |
| 5,966,068 A | 10/1999 | Wicks |
| 5,970,474 A | 10/1999 | LeRoy |
| 5,991,739 A | 11/1999 | Cupps |
| 6,134,548 A | 10/2000 | Gottsman |
| 6,167,255 A | 12/2000 | Kennedy |
| 6,175,922 B1 | 1/2001 | Wang |
| 6,208,976 B1 | 3/2001 | Kinebuchi |
| 6,236,974 B1 | 5/2001 | Kolawa |
| 6,282,491 B1 | 8/2001 | Bochmann |
| 6,295,541 B1 | 9/2001 | Bodnar |
| 6,300,947 B1 | 10/2001 | Kanevsky |
| 6,341,268 B2 | 1/2002 | Walker |
| 6,356,543 B2 | 3/2002 | Hall |
| 6,366,650 B1 | 4/2002 | Rhie |
| 6,384,850 B1 | 5/2002 | McNally et al. |
| 6,415,138 B2 | 7/2002 | Sirola |
| 6,590,588 B2 | 7/2003 | Lincke |
| 6,594,347 B1 | 7/2003 | Calder |
| 6,836,537 B1 | 12/2004 | Zimgibl |
| 6,871,325 B1 | 3/2005 | McNally et al. |
| 6,873,693 B1 | 3/2005 | Langseth |
| 6,973,437 B1 | 12/2005 | Olewicz |
| 6,976,004 B2 | 12/2005 | Wittrup |
| 6,982,733 B1 | 1/2006 | McNally et al. |
| 7,069,228 B1 | 6/2006 | Rose |
| 7,216,152 B2 | 5/2007 | Short |
| 7,277,717 B1 | 10/2007 | Hart |
| 7,295,920 B2 | 11/2007 | Finkelstein |
| 7,359,871 B1 | 4/2008 | Paasche |
| 7,386,477 B2 | 6/2008 | Fano |
| 7,392,206 B1* | 6/2008 | Frazier ............... G06Q 10/0639 |
| | | 705/14.19 |
| 7,437,305 B1 | 10/2008 | Kantarjiev |
| 7,505,929 B2 | 3/2009 | Angert |
| 7,680,690 B1 | 3/2010 | Catalano |
| 7,966,215 B1 | 6/2011 | Myers |
| 8,073,723 B1 | 12/2011 | Bilibin et al. |
| 8,146,077 B2 | 3/2012 | McNally et al. |
| 8,326,705 B2 | 12/2012 | Niessen et al. |
| 8,341,003 B1 | 12/2012 | Bilibin et al. |
| 8,595,050 B2 | 11/2013 | Scotto et al. |
| 8,620,753 B2* | 12/2013 | Burns .................. G06Q 10/06 |
| | | 186/38 |
| 8,655,743 B1* | 2/2014 | Shimoff ............... G06Q 30/00 |
| | | 705/26.1 |
| 8,660,903 B1* | 2/2014 | Croak ................ G06Q 30/0641 |
| | | 705/26.1 |
| 8,805,729 B2* | 8/2014 | Afram ............... G06Q 30/0601 |
| | | 705/26.1 |
| 9,530,159 B2* | 12/2016 | Glasgow .............. G06Q 10/101 |
| 2001/0047301 A1 | 11/2001 | Walker |
| 2002/0005430 A1 | 1/2002 | Pentel |
| 2002/0013734 A1* | 1/2002 | Bueno ................... G06Q 30/06 |
| | | 705/15 |
| 2002/0046093 A1 | 4/2002 | Miller |
| 2002/0107747 A1* | 8/2002 | Gerogianni ............ G06Q 30/06 |
| | | 705/26.44 |
| 2002/0143655 A1* | 10/2002 | Elston ................... G06Q 20/02 |
| | | 705/26.81 |
| 2002/0161604 A1 | 10/2002 | Kardos |
| 2002/0175211 A1* | 11/2002 | Dominquez ........ G06K 17/0022 |
| | | 235/492 |
| 2002/0178034 A1 | 11/2002 | Gardner |
| 2002/0188492 A1* | 12/2002 | Borton .................. G06Q 10/06 |
| | | 705/7.13 |
| 2003/0055727 A1* | 3/2003 | Walker .................. G06Q 20/20 |
| | | 705/14.17 |
| 2003/0065565 A1* | 4/2003 | Wagner ................. G06Q 10/08 |
| | | 705/15 |
| 2003/0125963 A1 | 7/2003 | Haken |
| 2004/0044578 A1* | 3/2004 | Kim ...................... G06Q 30/06 |
| | | 705/15 |
| 2005/0004843 A1* | 1/2005 | Heflin ................... G06Q 10/08 |
| | | 705/15 |
| 2005/0015256 A1* | 1/2005 | Kargman ............... G06Q 30/06 |
| | | 704/272 |
| 2005/0015301 A1* | 1/2005 | Johnson .............. G06Q 10/087 |
| | | 705/15 |
| 2005/0035190 A1* | 2/2005 | Nanbu ................. G06Q 20/085 |
| | | 235/379 |
| 2005/0045728 A1* | 3/2005 | Kargman .............. G06Q 20/387 |
| | | 235/462.45 |
| 2005/0049940 A1 | 3/2005 | Tengler |
| 2005/0131937 A1* | 6/2005 | Parkyn ................. H04L 41/0654 |
| 2005/0209963 A1* | 9/2005 | Momose ................. G06F 3/122 |
| | | 705/39 |
| 2006/0010037 A1 | 1/2006 | Angert et al. |
| 2006/0020497 A1 | 1/2006 | Mcnally |
| 2006/0069578 A1 | 3/2006 | Borkowski et al. |
| 2006/0080164 A1* | 4/2006 | Sutcliffe ................ G06Q 30/06 |
| | | 705/15 |
| 2006/0080176 A1 | 4/2006 | Sutcliffe |
| 2006/0178943 A1* | 8/2006 | Rollinson .......... G06Q 30/0601 |
| | | 705/26.1 |
| 2006/0191885 A1* | 8/2006 | Near ..................... A47J 27/62 |
| | | 219/214 |
| 2007/0007331 A1* | 1/2007 | Jasper ................... G06Q 20/20 |
| | | 235/379 |
| 2007/0011061 A1 | 1/2007 | East |
| 2007/0150375 A1* | 6/2007 | Yang .................... G06Q 10/08 |
| | | 705/339 |
| 2007/0294129 A1 | 12/2007 | Froseth et al. |
| 2008/0076451 A1 | 3/2008 | Sheha et al. |
| 2008/0104059 A1 | 5/2008 | Segel |
| 2008/0215382 A1* | 9/2008 | Lutnick .................. G06Q 10/02 |
| | | 705/5 |
| 2008/0222004 A1* | 9/2008 | Pollock ............... G06Q 30/0603 |
| | | 705/15 |
| 2008/0249658 A1* | 10/2008 | Walker ..................... G07F 9/02 |
| | | 700/236 |
| 2008/0249869 A1* | 10/2008 | Angell ................... G06Q 30/02 |
| | | 705/14.1 |
| 2008/0262972 A1* | 10/2008 | Blake ................... G06Q 20/401 |
| | | 705/75 |
| 2008/0319864 A1 | 12/2008 | Leet |
| 2009/0030810 A1* | 1/2009 | Komenda .......... G06Q 30/0603 |
| | | 705/26.81 |
| 2009/0043617 A1* | 2/2009 | Thomas ................. G06Q 10/00 |
| | | 705/28 |
| 2009/0048890 A1* | 2/2009 | Burgh ................... G06Q 10/04 |
| | | 705/7.15 |
| 2009/0076875 A1* | 3/2009 | Lert, Jr. ................ G06Q 30/016 |
| | | 705/14.3 |
| 2009/0099972 A1* | 4/2009 | Angert ................ G06Q 10/087 |
| | | 705/80 |
| 2009/0106124 A1* | 4/2009 | Yang .................... G06Q 10/08 |
| | | 705/26.1 |
| 2009/0150193 A1 | 6/2009 | Hong |
| 2009/0167553 A1 | 7/2009 | Hong |
| 2009/0204492 A1 | 8/2009 | Scifo et al. |
| 2009/0307096 A1* | 12/2009 | Antonellis .......... G06Q 10/087 |
| | | 705/15 |
| 2009/0319166 A1 | 12/2009 | Khosravy et al. |

(56) References Cited

U.S. PATENT DOCUMENTS

| | | | |
|---|---|---|---|
| 2010/0038416 A1* | 2/2010 | Canora | G06Q 30/02 |
| | | | 235/375 |
| 2010/0042463 A1* | 2/2010 | Brockman | G06Q 10/08 |
| | | | 705/30 |
| 2010/0070376 A1 | 3/2010 | Proud et al. | |
| 2010/0250384 A1 | 9/2010 | Bhargava | |
| 2010/0268620 A1 | 10/2010 | Angert | |
| 2010/0332402 A1* | 12/2010 | Kantarjiev | G06Q 10/08 |
| | | | 705/304 |
| 2011/0040642 A1 | 2/2011 | O'Dell | |
| 2011/0071896 A1* | 3/2011 | Dasher | G06Q 30/02 |
| | | | 705/14.35 |
| 2011/0106664 A1* | 5/2011 | Landau | G06Q 10/02 |
| | | | 705/27.1 |
| 2011/0161137 A1 | 6/2011 | Ubalde et al. | |
| 2011/0191194 A1 | 8/2011 | Lutnick et al. | |
| 2011/0194136 A1* | 8/2011 | Liu | G06F 3/1204 |
| | | | 358/1.15 |
| 2011/0208617 A1 | 8/2011 | Weiland | |
| 2011/0218839 A1* | 9/2011 | Shamaiengar | G06Q 30/0203 |
| | | | 705/7.32 |
| 2011/0251915 A1* | 10/2011 | Lutnick | G06Q 10/08345 |
| | | | 705/26.3 |
| 2011/0258011 A1 | 10/2011 | Burns | |
| 2011/0258134 A1* | 10/2011 | Mendez | G06Q 10/06 |
| | | | 705/332 |
| 2012/0010923 A1* | 1/2012 | Yarmolich | G06Q 20/10 |
| | | | 705/7.32 |
| 2012/0022905 A1* | 1/2012 | Meyer | G06Q 10/00 |
| | | | 705/7.13 |
| 2012/0089927 A1* | 4/2012 | Salmen | G07G 1/0009 |
| | | | 715/753 |
| 2012/0136702 A1* | 5/2012 | Fajkowski | G06Q 20/387 |
| | | | 705/14.13 |
| 2012/0203619 A1 | 8/2012 | Lutnick et al. | |
| 2012/0246039 A1* | 9/2012 | Fain | G06Q 10/08 |
| | | | 705/32 |
| 2012/0290390 A1* | 11/2012 | Harman | G06Q 30/06 |
| | | | 705/26.1 |
| 2012/0290413 A1 | 11/2012 | Harman | |
| 2012/0290427 A1* | 11/2012 | Reed | G06Q 50/01 |
| | | | 705/26.2 |
| 2013/0027561 A1* | 1/2013 | Lee | G06Q 30/02 |
| | | | 348/150 |
| 2013/0038800 A1 | 2/2013 | Yoo | |
| 2013/0103605 A1 | 4/2013 | Villegas | |
| 2013/0110650 A1 | 5/2013 | Sutcliffe | |
| 2013/0110651 A1* | 5/2013 | Sutcliffe | G06Q 30/0603 |
| | | | 705/15 |
| 2013/0117096 A1* | 5/2013 | Klein | G06Q 30/0208 |
| | | | 705/14.39 |
| 2013/0144730 A1 | 6/2013 | Harman | |
| 2013/0144764 A1 | 6/2013 | Walling, III | |
| 2013/0198358 A1* | 8/2013 | Taylor | H04L 41/0213 |
| | | | 709/223 |
| 2013/0238462 A1* | 9/2013 | Lutnick | G06Q 10/08345 |
| | | | 705/26.4 |
| 2013/0346155 A1* | 12/2013 | Briggs | G06Q 30/0203 |
| | | | 705/7.32 |
| 2014/0025524 A1 | 1/2014 | Sim et al. | |
| 2014/0095276 A1* | 4/2014 | Sutcliffe | G07F 17/42 |
| | | | 705/14.1 |
| 2014/0164126 A1* | 6/2014 | Nicholas | A63F 9/24 |
| | | | 705/14.58 |

FOREIGN PATENT DOCUMENTS

| | | |
|---|---|---|
| EP | 1 081 625 A2 | 7/2001 |
| JP | 62-050919 | 3/1987 |
| JP | 5-40767 | 2/1993 |
| JP | 6-52195 | 2/1994 |
| JP | 6-203051 | 7/1994 |
| JP | 9-160972 | 6/1997 |
| JP | 9-204466 | 8/1997 |
| JP | 9-296819 | 11/1997 |
| JP | 9-325988 | 12/1997 |
| JP | 9-330470 | 12/1997 |
| JP | 10-011194 | 1/1998 |
| JP | 10-224549 | 8/1998 |
| JP | 11-126147 | 5/1999 |
| JP | 11-191035 | 7/1999 |
| JP | 11-202974 | 7/1999 |
| WO | WO 95/34040 A1 | 12/1995 |
| WO | WO 97/08635 A1 | 3/1997 |
| WO | WO 98/35311 A1 | 8/1998 |
| WO | WO 99/17236 A1 | 4/1999 |
| WO | 2001071617 | 9/2001 |

OTHER PUBLICATIONS

U.S. Appl. No. 60/083,651, filed Apr. 30, 1998, Theodore Chen.
Kevin Crowston, Understanding Processes in Organizations, Jul. 1998.
Engaging Customers Across All Touch Points: A Roadmap for Leading Retailers, Blue Martini Software, Inc., www.bluemartini. com.
Chuck Andraka, Put your database on the Web, Data Based Advisor, v14, n6, p. 12, Jun. 1996.
Steven Vaughan-Nichols, Unleashing Databases on the Web—True wealth and power belong to those who control information access, Netguide, 1996, n307, P. 111.
P.L. Olympia, Cold Fusion 1.5; Autobahn, DBMS, v9, n8, p. 33, Jul. 1996.
eshop.com, eShop Technology, eshop.com, Jan. 1, 1996.
eshop.com, eShip Technology Merchant Manual, eShop.com, Feb. 21, 1996.
Kambe Tomonari, Screen design simulator "U-face", Information Processing Society of Japan (IPSJ) The 39th National convention colleciton of papers, 1457-1458, Oct. 16, 1989.
Kato Kiyosh, A Prototype of a User Interface Software for Portable Terminal with a Small Display Screen, Information Processing Society of Japan (IPSJ) The 53rd National co . . . .
Squirrel Systems, May 8, 1999, http://web.archive.org/web/19990508153731/www.squirrelsystems.com/about/company.
Robin Berger, POS Positions Spago for Growth, Squirrel Systems, Apr./May 1997.
Squirrel Systems, POS System, May 8, 1999, http://web.archive. org/web/19990508175824/www.squirrelsystems.com/products/newsq . . . .
Squirrel Systems, Squirrel Restaurant Management System.
Squirrel Systems, Press Releases, Squirrel Systems, Aug. 20, 1998.
Business Editors, Fujitsu and Sulcus Hospitality Group partner to develop first wireless computer for restaurant industry, Business Wire, Aug. 30, 1993.
Sulcus's Squirrel and cybermeals Ink Technology Alliance, Business Wire, Feb. 24, 1998.
Accel Partners Invest $10 Million incybermeals, Business Wire, May 28, 1998.
Rev Share Information, Cybermeals, Jan. 24, 1998.
Squirrel point-of-sale software, Squirrel Systems, Oct. 10, 1999.
Chapter 4—Wireless Data, Wireless Technologies and the National Information Infrastructure, Diane Pub Co, Oct. 1995.
Brew Moon Management Toasts SQUiRREL's "Seamless Solution", SQUiRREL Systems, Nov. 1998.
Squirrel Systems, Squirrel® Customer Profile: Chevys Fresh Mex®, Squirrel Systems—Restaurant Management, Aug. 1998.
Micro Systems, Inc., Appendix, User's Manual, 8700 HMS Version 2.10, micros Systems, Inc., 1995-1997.
Micro Systems, Inc., Chapter 1-11, User's Manual, 8700 HMS Version 2.10, micros Systems, Inc., 1995-1997.
Micro Systems, Inc., Full Service Operations, Micros 3700 Point-of-Sale System, Micro Systems, Inc., Nov. 11, 1996.
Micro Systems, Inc., New Products, Micros 3700 Point-of-Sale System, Micro Systems, Inc., Nov. 11, 1996.

(56) References Cited

OTHER PUBLICATIONS

Micro Systems, Inc., Quick Service Operations, Micro Systems, Inc., Nov. 11, 1996.
Micro Systems, Inc., All About Us, Micro Systems, Inc., Nov. 11, 1996.
Micro Systems, Inc., Full Service Operations, Micro Systems, Inc., Nov. 11, 1996.
Micro Systems, Inc., 8700 HMS Product Overview, Micro Systems, Inc., 2000.
Micro Systems, Inc., Micros Hand-Held TouchScreen, Micro Systems, Inc., Sep. 1992.
Micro Systems, Inc., The Micro 2700 HMS Touchscreen, Micro Systems, Inc.
RMS Touch, RMS-Touch—Touch Screen Restaurant Management System Product Description, RMSTouch.com, Feb. 15, 1997.
RMS Touch, Company Profile RMS, Touch.com, Integrated Restaurant Software, Feb. 15, 1997.
Elite32 Restaurant System, Compuwave Technologies Inc., 2000.
POS Infrared Restaurant System, Compuwave Technologies Inc., 2000.
Wireless POS Drive-Through System, Compuwave Technologies Inc., 2000.
Compuware Technologies Approved as Supplier to McDonald's Canda, Compuwave Technologies Inc., Sep. 14, 2000.
Wireless Restaurant System, Compuwave Technologies Inc., Feb. 7, 2001.
About Us, Compuwave Technologies Inc., Feb. 7, 2001.
Wireless Products, Compuwave Technologies Inc., Feb. 7, 2001.
Micros Systems, Inc., POS Configurator User's Guide, 3700 POS, Micros Systems, Inc., 1998.
Micros Systems, Inc., New Products, Micros Systems, Inc., Nov. 11, 1996.
Rita Marie Emmer, Marketing Hotels: Using Global Distribution System, Cornell Hotel and Restaurant Administration Quarterly, 1993, 34; 80, DOI: 10.1177/001088049303400614.
T. Imielinski, Adaptive Wireless Information Systems, 1994.
IBM, POS Computer, 1998.
Krishna Bharat, Migratory Applications.
Andrew Fano, Shopper's Eye: Using Lcoation-based filtering for a shopping agent in the physical world, 1998.
Len Lewis, Opening the gates, Progressive Grover, Jul. 1998.
Arthur Keller, The DIANA approach to mobile computing, CiteSeer, 1995.
A Chavez, A real-life experiment in creating an agent marketplace, PAAM, 1997.
Richard De Santa, Are you into your customers?, Supermarket Business, Jan. 1997.
Barron Housel, WebExpress: a system for optimizing web browsing in a wireless environment.
Carrie Lehman, Service connects restaurants, customers via orders by Internet, Alaska Journal of Commerce, Apr. 28, 1997.
Jennifer Rowley, Internet food retailing: the UK in context, ProQuest LLC, 1998.
John Soeder, Cyber Solicitation, Restaurant Hospitality, Sep. 1997.

\* cited by examiner

300

My To-do List (3)

| | | | |
|---|---|---|---|
| mine | Napoll Pizza (#965808) | Credit Inquiry | 10 days ago |
| mine | El Triunto (#70008) | Scheduled Task | 8 days ago |
| mine | Devon's Dogs LA (#80009) | Dashboard | 2 days ago |

For CS Managers (196)

| | | | |
|---|---|---|---|
| jtorboo | My Pizza (#15424) | Delayed Order | 20 minutes ago |
| Bobarlie | Taqueria Mana (#143534) | Delayed Order | 18 minutes ago |
| Unclaimed | My Pizza (#15424) | Delayed Order | 10 minutes ago |
| Unclaimed | Taqueria Mana (#143534) | Delayed Order | 4 minutes ago |
| amoob | AJA (#10101) | Pause Restaurant | 20 days ago |
| amoob | Mana Pizza (#133333) | User Review | 18 days ago |
| Dindians | BJ Pizza (#10101) | Pause Restaurant | 16 days ago |
| Unclaimed | ABC Bar (#333333) | Scheduled Task | 10 days ago |

Unclaimed Tickets — 308

OrderHub
- Appointment (2)
- OrderHub Inactivity (1)
- Technical Support (0)

Urgent
- Failed (7)
- Non-confirm (2)
- Callback - Blackout Item (4)
- Callback - Order Issue (4)
- Callback - Technical Issue (4)
- Incoming Call – OrderHub (4)
- 3rd Party Cancellation (1)

Non-Urgent
- Pause Restaurant (1)
- User Review (1)
- Scheduled Task (1)

| | Minimum late time | Maximum late time | Minimum credit amount | Maximum credit amount |
|---|---|---|---|---|
| 1210 — | 1 min | T1 min | $x | $xx |
| 1212 — | T1 min | T2 min | $y | $yy |
| 1214 — | T2 min | T3 min | $z | $zz |

| Cancellation Reason | Diner Credit Amount for First Time Diner | Diner Credit Amount for Repeat Diner |
|---|---|---|
| Restaurant requested to cancel order for lack of delivery drivers | $m | $mm |

FIG. 14

| | |
|---|---|
| Ticket ID | — 1602 |
| Ticket type | —1604 |
| Ticket creation time | — 1606 |
| Ticket snooze wakeup time | —1608 |
| Ticket category | —1610 |
| Ticket claiming representative ID (NULL if not claimed) | —1612 |
| Ticket claiming time | — 1614 |
| Associated order ID | —1616 |
| Associated order cancellation reason | — 1618 |
| Associated order delayed delivery time amount | — 1620 |
| Serving restaurant for the associated order | —1622 |
| Status | —1624 |

SYSTEM, METHOD AND APPARATUS FOR MANAGING MADE-TO-ORDER FOOD TICKETS FOR A RESTAURANT SERVICE

CROSS REFERENCE TO RELATED APPLICATIONS

This application is a division application of co-pending U.S. patent application Ser. No. 13/743,009, entitled "SYSTEM, METHOD AND APPARATUS FOR MANAGING MADE-TO-ORDER FOOD TICKETS FOR A RESTAURANT SERVICE," filed Jan. 16, 2013, assigned to GrubHub Holdings Inc. of Chicago, Ill., and which is hereby incorporated by reference in its entirety to provide continuity of disclosure. This application is related to U.S. Patent Application No. 61/640,439, entitled "SYSTEM AND METHOD FOR MANAGING THE DELIVERY OF MADE-TO-ORDER FOOD," filed Apr. 30, 2012, assigned to GrubHub, Inc. of Chicago, Ill., and which is hereby incorporated by reference. This application is also related to U.S. patent application Ser. No. 13/622,659, entitled "SYSTEM, METHOD AND APPARATUS FOR MANAGING THE DELIVERY OF MADE-TO-ORDER FOOD," filed Sep. 19, 2012, assigned to GrubHub, Inc. of Chicago, Ill., and which is hereby incorporated by reference. Furthermore, this application is related to U.S. patent application Ser. No. 13/337,362, entitled "REAL TIME INTEGRATED SHOPPING SERVICE," filed Dec. 27, 2011, assigned to GrubHub, Inc. of Chicago, Ill., and which is hereby incorporated by reference. This application is also related to U.S. patent application Ser. No. 13/227,771, entitled "AUTOMATIC TEST ORDER GENERATION FOR A RETAIL SHOPPING SERVICE," filed Sep. 8, 2011, assigned to GrubHub, Inc. of Chicago, Ill., and which is hereby incorporated by reference.

FIELD OF THE DISCLOSURE

The present invention relates to a system, method and apparatus for managing customer support tickets, and more particularly relates to a system, method and apparatus utilizing software applications operating on a restaurant service server, an on-site service appliance, and a delivery driver mobile device respectively to efficiently manage made-to-order food service customer support tickets.

DESCRIPTION OF BACKGROUND

Restaurants traditionally have not participated in shopping services because, unlike non-perishable goods, food generally should be consumed shortly after preparation. However, the adoption of the Internet has made restaurant shopping services feasible, as diners can be given a selection of restaurants within a specified distance of their location. Additionally, for each participating restaurant of a restaurant service, diners are presented with a list of menu items for selection to place orders. Orders are then forwarded to corresponding restaurants for food preparation. Food can then be delivered to diners, or diners can go to the restaurants to pick up their orders. Made-to-order food is generally delivered by delivery drivers. In certain cases, such as heavily congested areas, delivery drivers deliver made-to-order food by walking or bicycling, instead of driving automobiles.

For a restaurant service, many types of problems may arise from serving made-to-order food to diners. For example, the restaurant service may fail to send an order placed by a diner to the serving restaurant corresponding to the order. The failure to transmit the order to the restaurant can be caused by a number of factors, such as a poor communication connection or an on-site service appliance failure. When an order is successfully transmitted to the restaurant, it needs to be confirmed by the restaurant. Due to various reasons, such as human errors made by employees of the restaurant, the restaurant may fail to confirm the order within a certain time frame. Accordingly, the diner for the order cannot be timely served. Additionally, the restaurant may request to cancel an order in certain cases. For example, where the restaurant is too busy or cannot find a delivery driver, the restaurant requests the restaurant service to cancel the order.

An order may be late for many reasons. For example, the serving restaurant is late to prepare food for the order. Similarly, the delivery driver for the order may be late to deliver the order. For instance, the delivery driver is lost in driving her delivery route. As an additional example, inclement weather can cause late delivery of an order.

Where a problem arises in serving made-to-order food to a diner, a restaurant service provider or a restaurant usually relies on a telephone operator to handle the problem. For example, the telephone operator (such as a restaurant employee) handles calls from unhappy diners, calms them, and mitigates the problem. The conventional method to handle restaurant service problems does not provide an efficient way to provide high quality food service to diners.

OBJECTS OF THE DISCLOSED SYSTEM, METHOD, AND APPARATUS

An object of the disclosed customer service tickets management system for a restaurant service that serves made-to-order food is to provide efficient resolutions to customer service tickets for the restaurant service;

Another object of the disclosed customer service tickets management system is to display customer support tickets in different categories;

Another object of the disclosed customer service tickets management system is to order displayed customer support tickets within the same category by types and customer service time thresholds;

Another object of the disclosed customer service tickets management system is to allow a customer service representative to claim a ticket;

Another object of the disclosed customer service tickets management system is to allow a customer support manager to manage tickets claimed by her customer service representatives;

Another object of the disclosed customer service tickets management system is to issue a diner credit to a diner for late delivery of her order;

Another object of the disclosed customer service tickets management system is to issue multiple diner credits to a diner for late delivery of her order;

Another object of the disclosed customer service tickets management system is to issue a diner credit to a diner for cancellation of her order by the corresponding restaurant;

Another object of the disclosed customer service tickets management system is to issue a diner credit to a diner for failure of transmission of her order to the corresponding restaurant;

Another object of the disclosed customer service tickets management system is to issue a diner credit to a diner for problems caused by the restaurant service;

Another object of the disclosed customer service tickets management system is to pause a restaurant to make it unavailable to diners when communications with the restaurant are problematic;

Another object of the disclosed customer service tickets management system is to black out a menu item from a restaurant to make it unavailable to diners;

Other advantages of the disclosed customer service tickets management system will be clear to a person of ordinary skill in the art. It should be understood, however, that a system, method, or apparatus could practice the disclosed customer service tickets management system while not achieving all of the enumerated advantages, and that the customer service tickets management system is defined by the claims.

SUMMARY OF THE DISCLOSURE

By utilizing a restaurant service server, a restaurant service can efficiently manage customer support tickets and resolve diner issues. In one embodiment of the disclosed restaurant service, a restaurant service server retrieves a customer service ticket from a database. The ticket is generated by a restaurant server application. Alternatively, the ticket is generated by a driver server application in response to a message received from a delivery driver mobile device. Also, the ticket can be generated by an order server application. The restaurant service server determines a type and a category of the ticket. Additionally, the restaurant service server retrieves a set of customer service time thresholds for the ticket. Based on the type and the set of customer service time thresholds, the restaurant service server assigns a display order for the ticket within the category. Accordingly, the ticket is displayed on a customer service representative device under the display order.

In addition, the restaurant service server retrieves a diner credit policy for the type of the ticket from the database. The restaurant service server sets a diner credit amount in compliance with the diner credit policy for the ticket. In an additional refinement, the restaurant service server sends the ticket and the diner credit policy to a customer service representative device over a network connection. Furthermore, the restaurant service server receives the diner credit amount from the customer service representative device.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 3 is a sample display showing some customer service tickets for a restaurant service in accordance with the teachings of this disclosure.

FIG. 12 is a table depicting a diner credit policy for late orders in accordance with the teachings of this disclosure.

FIG. 14 is a table depicting a diner credit policy for order cancellation in accordance with the teachings of this disclosure.

FIG. 16 is a sample ticket data structure in accordance with the teachings of this disclosure.

DETAILED DESCRIPTION OF THE ILLUSTRATED EMBODIMENT

Figure 1:
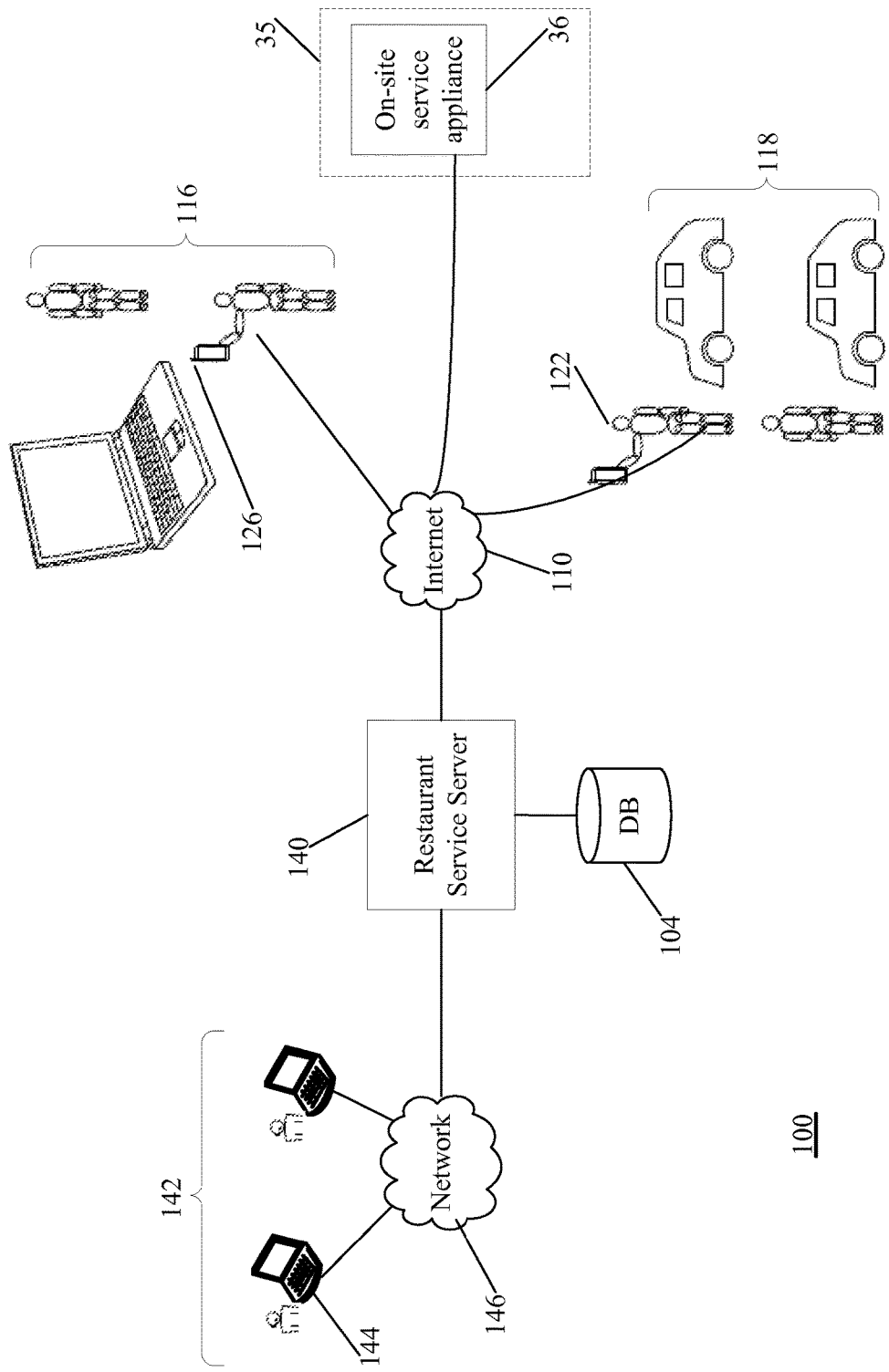
FIG. 1 is a simplified block diagram of a customer service tickets management system constructed in accordance with this disclosure.

Turning to the Figures and to FIG. 1 in particular, a customer service system 100 for managing made-to-order food tickets for a restaurant service is shown. The illustrated customer service management system 100, utilizing a restaurant service server 140 and a database 104, allows a restaurant service to efficiently manage customer support tickets and resolve diner issues arising from serving made-to-order food. Furthermore, the illustrated customer service management system 100 allows the restaurant service to issue diner credit to diners for various reasons, such as late delivery or order cancellation.

The restaurant service server 140 hosts one or more server software programs or applications. In one embodiment in accordance with the present teachings, a ticket server application, a restaurant server application, an order server application, and a driver server application are hosted and run on the server 140. Additionally, the server 140 includes a processor, a network interface, and some amount of memory.

Figure 19:
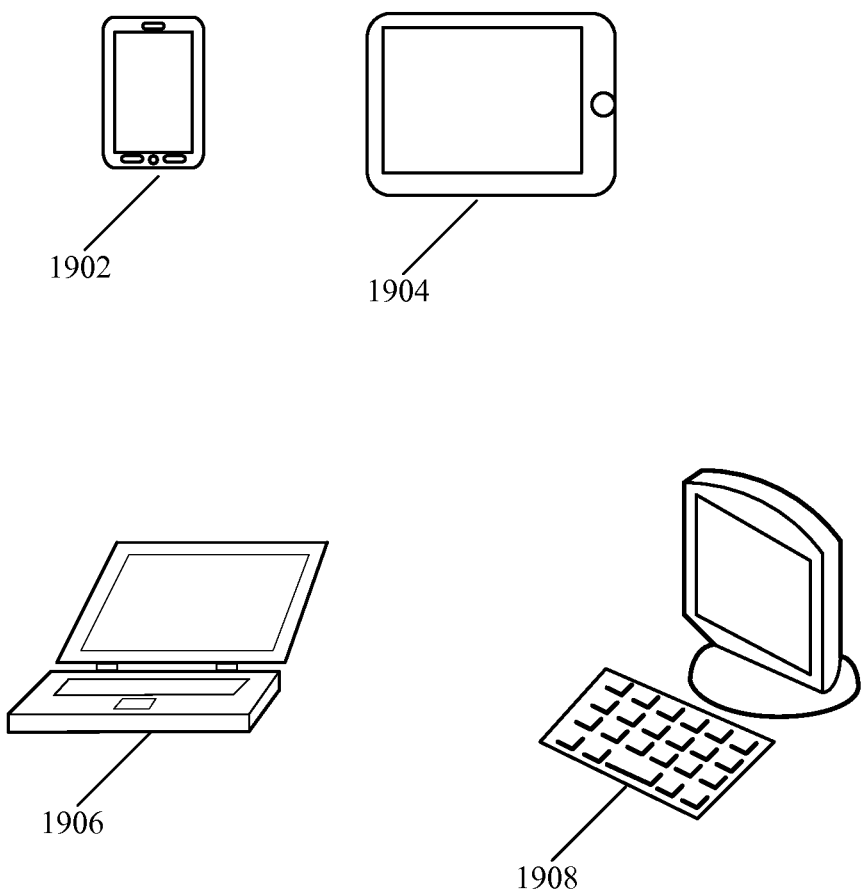
FIG. 19 is a perspective view of customer service representative devices, delivery driver mobile devices, and diner devices in accordance with the teachings of this disclosure.

The order server application collects orders from diners 116, who use diner devices 126 (which can be one of the devices pictured in FIG. 19), over a wide area network 110 such as the Internet. The orders are queued in the database 104, which also includes information regarding diners as well as restaurant menus, as more fully set forth in U.S. application Ser. No. 13/337,362, which was previously incorporated by reference. The restaurant server application processes queued orders and communicates those orders to a member restaurants 35 via the Internet 110, a public telephone network (not shown), or some other method. In one embodiment, the member restaurant 35 houses an on-site service appliance 36 and/or a point-of-sale system ("POS") (not shown).

The member restaurant 35 and a delivery service may receive an order using the on-site service appliance 36. The member restaurant 35 then prepares food for the order, which is delivered by a delivery driver 118 to the corresponding diner. When the restaurant server application fails to transmit the order to the appliance 36, the restaurant server application generates a ticket for such failure and stores the ticket into the database 104. Additionally, the restaurant server application generates a ticket and stores it into the database 104 when the restaurant 35 fails to confirm the transmitted order. In a further implementation, the server 140 is coupled to a communication server (not shown) over a network (such as an intranet or extranet). The communication server is used to communicate with the diners 116 over the Internet 110 or a public telephone network (not shown).

The driver server application communicates with a driver mobile device 122, which runs a driver mobile software application, over the Internet 110. Alternatively, the driver server application communicates with the driver mobile device 122 via the communication server. The driver mobile device 122 (which can be one of the mobile devices 1902, 1904,1906 pictured in FIG. 19) includes a housing that comprises a touchscreen, a display, a processor, a wireless network interface, and some amount of memory. For example, the driver mobile device 122 is a smartphone, such as an iPhone device created by Apple Inc.

The delivery driver 118 uses the driver mobile device 122 to retrieve orders from the driver server application for delivery, as more fully set forth in U.S. application No. 61/640,439, which was previously incorporated by reference. In addition, the delivery driver 118 uses the driver mobile device 122 to send order delivery statuses to the driver server application. When an order is delivered late, the driver server application may generate a ticket of late order type and stores the ticket into the database 104. Furthermore, the driver mobile device 122 can send order delivery statuses to the diner device 126 over the Internet 110 or a public telephone network, either directly or through the restaurant service.

The ticket server application accesses the database 104 to retrieve and update customer service tickets. Furthermore, the ticket server application communicates with customer service representative devices 144, coupled to the server 140 over a network 146 (such as an intranet or extranet). Customer service representatives 142 uses the devices 144 (which can be one of the devices pictured in FIG. 19) to request tickets from the restaurant service server 140. Additionally, the devices 144 send ticket updates to the ticket server application.

Figure 2:
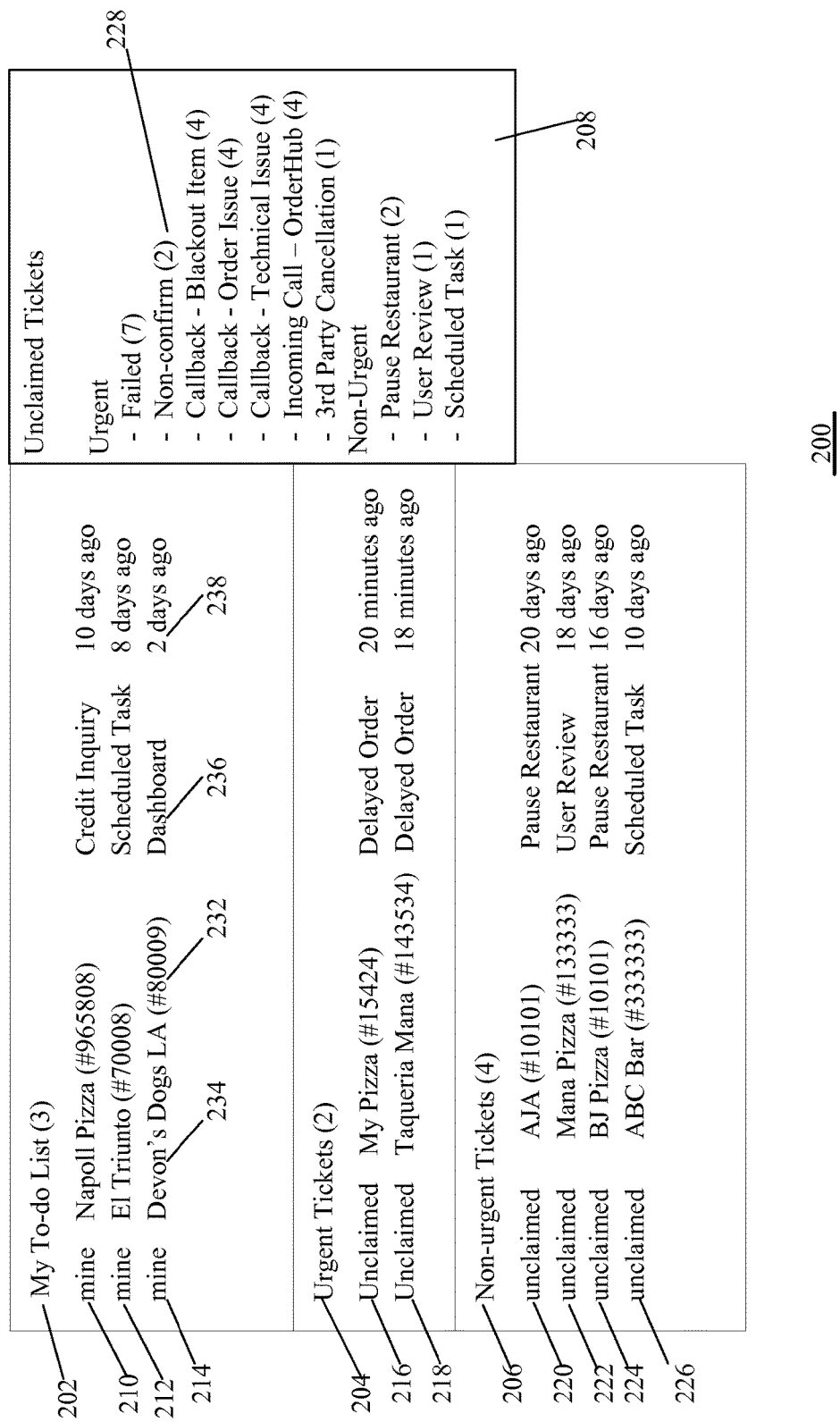
FIG. 2 is a sample display showing some customer service tickets for a restaurant service in accordance with the teachings of this disclosure.

A sample display 200 of the devices 144 showing customer service tickets for a customer service representative 142 is illustrated by reference to FIGS. 2 and 3. A panel 202 of the display 200 displays a list of tickets that the representative has claimed and is going to work on. When the representative 142 claims a ticket (such as tickets 210,212, 214), the status of the claimed ticket changes from unclaimed to claimed. Accordingly, the device 144 sends the status update for the claimed ticket to the restaurant service server 140 which subsequently stores the status update into the database 104. Furthermore, the claimed ticket is no longer available to be claimed by other representatives.

Each ticket, such as the ticket 214, may include an order id 232 that is associated with the ticket 214, a serving restaurant 234 for the order, a type 236 of the ticket 214, and a time 238 indicating the age of the ticket 214. A sample ticket data structure 1600 is further illustrated by reference to FIG. 16. The ticket data structure 1600 includes a ticket ID 1602 and a ticket type 1604. In one implementation, the ticket type 1604 is a failed type which indicates that the restaurant server application failed to transmit an order to the appliance 36. Such failure can be caused by various reasons, such as malfunctioning of the appliance 36 or a poor network connection between the restaurant server application and the appliance 36. In a different implementation, for example, such failure is caused by malfunctioning of a fax machine used by the restaurant 35 to receive orders from the restaurant server application.

A non-confirm type for a ticket indicates that the restaurant server application failed to receive a confirmation for an order within a particular time frame (such as ten minutes after successful transmission of the order to the restaurant 35) from the restaurant 35. A callback blackout item type for a ticket indicates that the ticket is programmatically generated when a restaurant calls the restaurant service to black out a menu item to make it unavailable to diners. A callback order issue type for a ticket indicates that the ticket is programmatically generated when a restaurant or a diner calls the restaurant service for an order issue. Similarly, a callback technical issue type for a ticket indicates that the ticket is programmatically generated when a restaurant or a diner calls the restaurant service for a technical issue. In one implementation, tickets of the failed, non-confirm, callback blackout item, callback order issue, callback technical issue, and some other types are categorized as urgent tickets. Tickets that are not in the urgent category are collectively termed as non-urgent tickets.

Non urgent tickets include, but are not limited to, pause restaurant type, scheduled task type, user review type, and data error type. The pause restaurant type indicates to a customer service representative that she makes a restaurant unavailable to diners until the representative can successfully transmit a test order to the restaurant and receive a confirmation of the test order. The scheduled task type indicates a scheduled task, while the user review type indicates tickets that are generated when diners respond to a survey sent to them after their first experience with placing an order using the restaurant service. The data error type indicates tickets that are created when diners report errors in restaurant menus.

Different from urgent and non-urgent categories, a general service category includes appointment, restaurant time-out, restaurant inactive, and technical support types of tickets. The appointment type indicates tickets for scheduling appointments, while the technical support type indicates tickets that are programmatically generated for technical support issues. The restaurant time-out type indicates tickets that are automatically generated when a member restaurant is in a timed out state and the last activity from the restaurant is more than two hours before the current time. Similarly, the restaurant inactive type indicates tickets that are automatically generated when a member restaurant is in an inactive state and the last activity from the restaurant is more than forty eight hours before the current time.

The ticket data structure 1600 further includes a ticket creation time 1606 and a ticket snooze wakeup time 1608. The ticket creation time 1606 indicates the date and time when the ticket is generated. Alternatively, the ticket creation time 1606 represents the date and time when the ticket is first stored into the database 104. The ticket snooze wakeup time 1608 indicates a time when the underlying ticket is expected to be handled. For example, where a ticket is scheduled to be processed six hours in the future, the ticket snooze wakeup time 1608 is set to the future time that is six hours from the present time.

The ticket data structure 1600 also includes a ticket category 1610 indicating whether the underlying ticket is an urgent ticket, non-urgent ticket, or general service ticket. Alternatively, the ticket category information is derived from the ticket type 1604, instead of stored in the database 104. Additionally, the sample ticket data structure 1600 includes a ticket claiming representative ID 1612 and a ticket claiming time 1614. The ticket claiming representative ID 1612 identifies the customer service representative who claimed the underlying ticket, while the ticket claiming time 1614 identifies the time when the customer service representative claimed the underlying ticket. When a ticket is associated with an order, the data structure 1600 further includes an associated order ID 1616 that identifies the order.

Where the order is cancelled (such as by the serving restaurant) or is delivered late, the data structure 1600 includes an associated order cancellation reason 1618 and an associated order delayed delivery time amount 1620 respectively. Alternatively, the order cancellation reason and the delayed delivery time amount are stored in an order data structure and are retrieved based on the order ID 1616. In addition, the data structure 1600 includes a serving restaurant for the associated order 1622. Alternatively, the serving restaurant for the associated order 1622 is retrieved from the database 104 based on the associated order ID 1616. Furthermore, the data structure 1600 includes a ticket status 1624. For example, when a ticket is resolved, the ticket status 1624 may be set to "Resolved." A person of ordinary skill in the art will appreciate that the data structure 1600 may include other fields to practice the present teachings. For example, the data structure 1600 may include a note field (not shown) and a history field (not shown).

Turning back to FIG. 2, unclaimed tickets are shown in panels 204 and 206. The panel 204 displays unclaimed urgent tickets 216,218, while the panel 206 displays unclaimed non-urgent tickets 220,222,224,226. Additionally, the display 200 shows an unclaimed tickets summary panel 208, which displays the amount of tickets of each type within both urgent and non-urgent categories. For example, as indicated at 228, there are two ticket of the non-confirm type. In one implementation, each line in the panel 208 is a link, that can be clicked to display the corresponding tickets displayed in the panels 204 and/or 206.

Turning now to FIG. 3, a sample display 300 displaying customer service tickets for a customer service support manager is shown. A panel 302 of the display 300 shows list of tickets that the manager has claimed and is going to work on. A second panel 304 displays claimed tickets 310,312, 314,316,318,320. The second panel 304 also displays unclaimed tickets 322 and 324. The second panel 304 indicates the claiming representative for each of the claimed tickets 310,312,314,316,318,320. For example, the user name of the representative who claimed the ticket 310 is shown as "jtorboo." The display 300 further shows a general service ticket summary 308 inside an unclaimed tickets summary panel 306. The process by which the device 144 retrieves the tickets and displays them on its screen is further illustrated by reference to FIG. 4.

Figure 4:
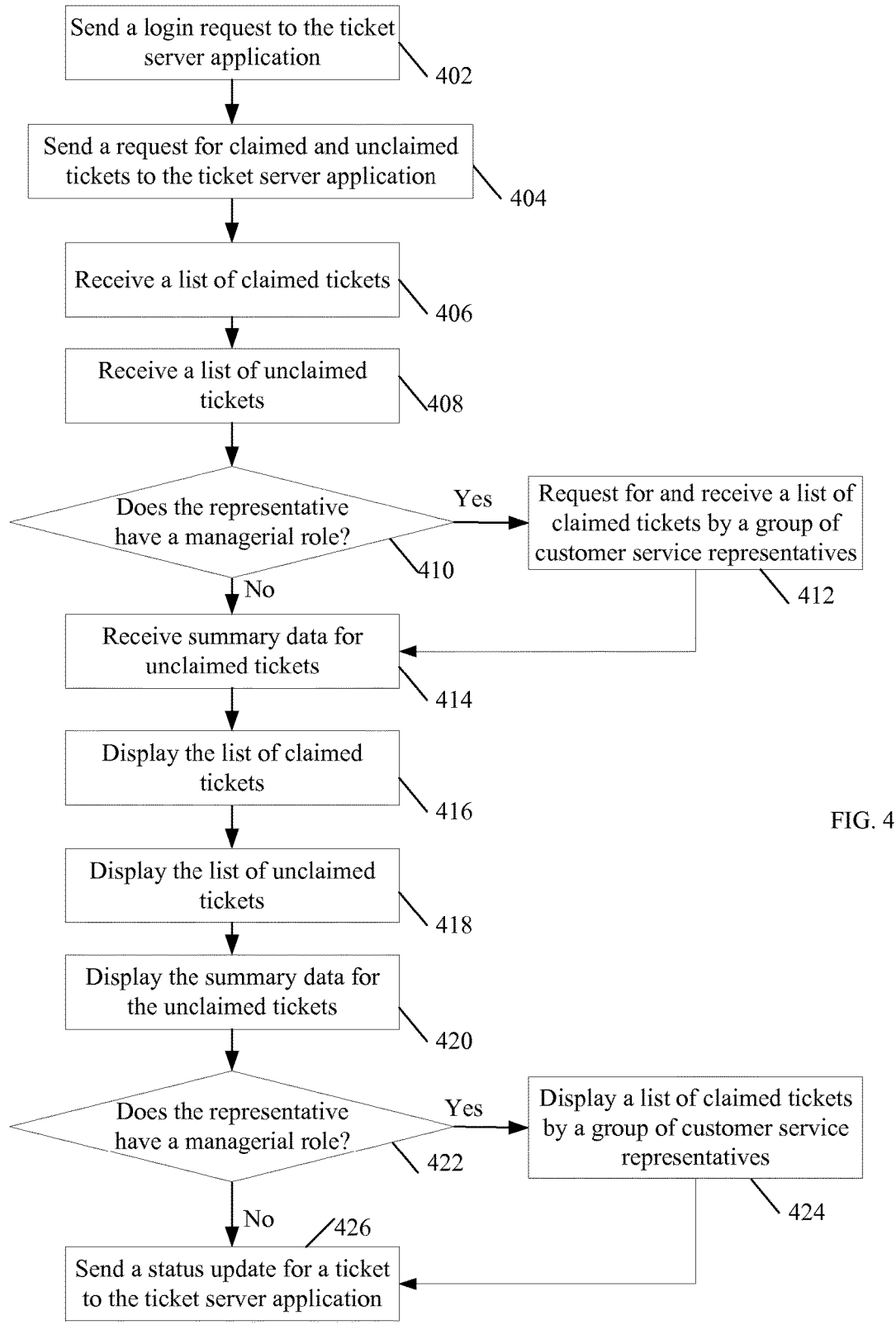
FIG. 4 is a flowchart depicting a process by which a customer service representative device retrieves customer service tickets from a restaurant service server and displays the tickets on a screen of the device in accordance with the teachings of this disclosure.

Referring to FIG. 4, at 402, a software application running on the device 144 sends a login request to the ticket server application or different server application that handles user authentication and authorization. In one implementation, the software application is a web browser, such as the popular Internet Explorer and Chrome browsers. In such a case, the ticket server application provides web pages, containing customer service ticket data, to the web browser. For example, upon successful authentication and/or authorization of the login request, the ticket server application generates one or more web pages of tickets. Subsequently, the one or more web pages are displayed by the web browser.

In a different implementation, upon successfully logging into the server 140, at 404, the software application sends a request for claimed and unclaimed tickets to the ticket server application. The software application may also request for tickets from the ticket server application under other conditions. For example, the software application periodically requests for updates of tickets (such as new tickets created by the restaurant server application). In a different implementation, the ticket server application sends new tickets or changed tickets to the software application when they become available. At 406, the software application receives a list of claimed tickets by the representative 142. At 408, the software application receives a list of unclaimed tickets. At 410, the software application checks whether the representative 142 has a managerial role. If so, at 412, the software application requests for and receives a list of claimed tickets by a group of customer service representatives under her supervision. Alternatively, at 412, the software application receives the list without requesting for it.

In an alternate embodiment, the software application receives a single list of tickets and parses the single list into different lists of tickets (such as a list of claimed tickets and a list of unclaimed tickets) based on ticket category, ticket type, the role of the representative, and/or other criteria. At 414, the software application receives summary data of unclaimed tickets, such as those displayed in the panels 208 and 306 respectively. Alternatively, the software application parses the list of unclaimed tickets to derive the summary data of the unclaimed tickets.

At 416, the software application displays the list of claimed tickets in, for example, the panels 202 and 302. At 418, the software application displays the list of unclaimed tickets in, for example, the panels 204,206,304. At 420, the software application displays the summary data of the unclaimed tickets in, for example, the panels 208 and 306. The software application, at 422, checks whether the representative 142 has a managerial role. If so, at 424, the software application displays a list of tickets claimed by her subordinates in, for example, the panel 304. When the representative 142 claims or works on a ticket, the status of the ticket may be changed. Accordingly, at 426, the software application sends an update for the ticket to the ticket server application, which may save the change into the database 104.

Figure 5:
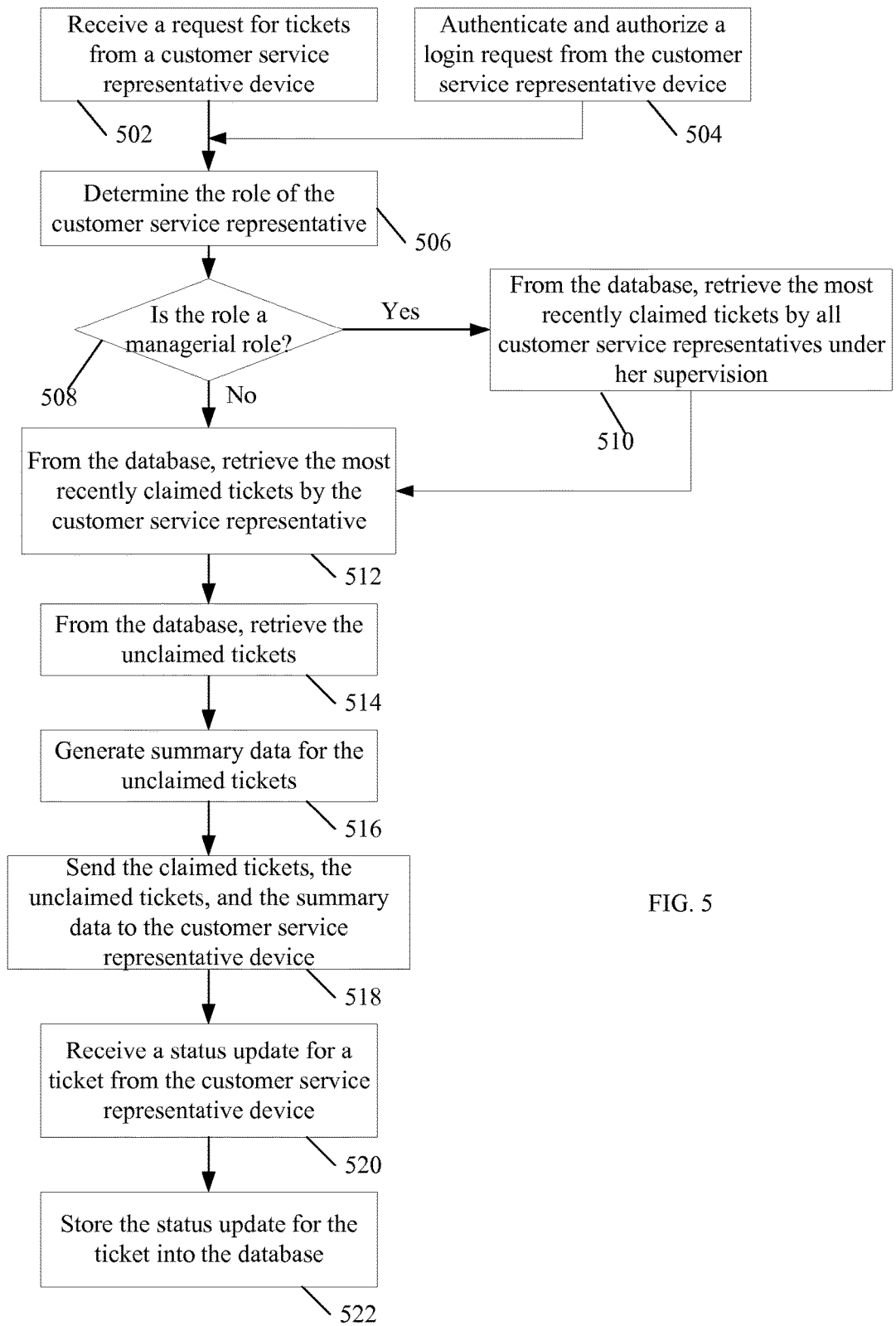
FIG. 5 is a flowchart depicting a process by which a restaurant service server provides customer service representative device with customer service tickets for a restaurant service in accordance with the teachings of this disclosure.

The process by which the ticket server application provides the lists of tickets (shown in FIG. 4) to the device 144 is illustrated by reference to FIG. 5. At 502, ticket server application receives a request (such as the request sent at 402) for tickets from the customer service representative device 144. At 506, the ticket server application determines the role of the customer service representative 142. For example, the ticket server application checks a user credential database (not shown) to determine the role of the customer service representative based on an identifier (such as a user ID) of the representative 142. Alternatively, at 504, the ticket server application authenticates and authorizes a login request (such as the login request sent at 404) from the device 144. At 508, the ticket server application checks whether the role of the representative 142 is a managerial role. If so, at 510, the ticket server application retrieves the most recently (such as within a week or a month) claimed tickets by all customer service representatives under her supervision from the database 104.

Regardless of the role of the representative 142, at 512, the ticket server application retrieves the most recently claimed tickets (such as tickets claimed in a previous week or month) by the representative 142 from the database 104. Additionally, at 514, the ticket server application retrieves the unclaimed tickets from the database 104. At 516, the ticket server application generates summary data (such as that displayed in the panels 208 and 306) for the unclaimed tickets. Alternatively, the ticket server application skips 516 and leaves the software application running on the device 144 to generate the summary data for the unclaimed tickets. At 518, the ticket server application sends the claimed tickets, the unclaimed tickets, and the summary data to the device 144. At 520, the ticket server application receives a status update (such as the update sent at 420) for a ticket from the device 144. Accordingly, at 522, the ticket server application stores the status update for the ticket into the database 104.

Figure 6:
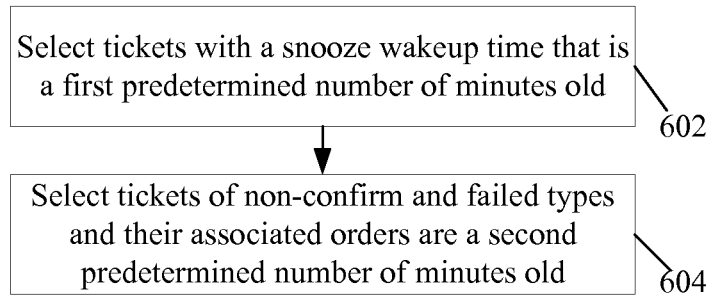
FIG. 6 is a flowchart depicting a process by which a restaurant service server determines a display order for a list of urgent customer service tickets for a restaurant service in accordance with the teachings of this disclosure.

The order in which tickets within a category are displayed are determined based on various factors. For example, the factors include the type of a ticket, the age of the ticket, the age of the order associated with the ticket, etc. The age of the ticket is the amount of time measured from the time when the ticket was created. Similarly, the age of the order is the amount of time measured from the time when the order was created. A process 600 by which the device 144 or the ticket server application determines the order in which urgent tickets are displayed is illustrated by reference to FIG. 6. At 602, the ticket server application first selects tickets with a snooze wakeup time that is a first predetermined number (such as sixteen) of minutes old for display. In other words, when a ticket has a snooze wakeup time set and the snooze wakeup time is sixteen or more minutes in the past from the current time, the ticket will be selected at 602. In one implementation, the ticket server application generates a web page to show the tickets, selected at 602, at top of the web page.

At 604, the ticket server application then selects tickets of non-confirm and failed types and their associated orders are a second predetermined number (such as seventeen) of minutes old. In a further implementation, the ticket server application selects additional tickets based other criteria, such as, for example, pickup order type, user flag type, and different predetermined numbers of minutes of ticket age. In a different implementation, the ticket server application may consider more or less criteria in determining display order of a category of tickets.

Figure 7:
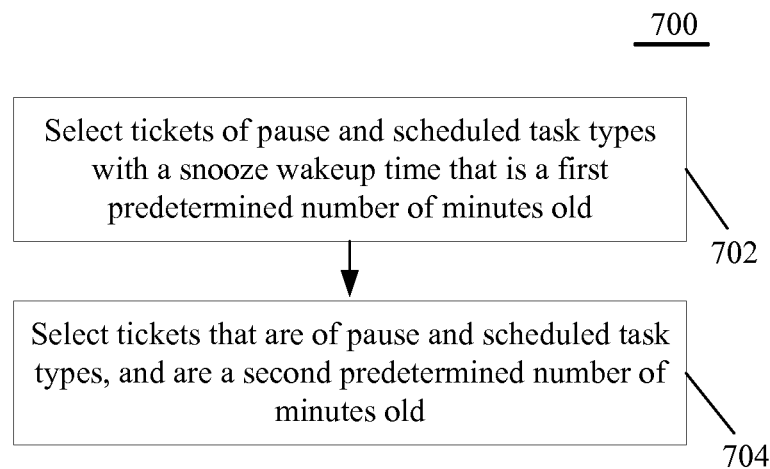
FIG. 7 is a flowchart depicting a process by which a restaurant service server determines a display order for a list of non-urgent customer service tickets for a restaurant service in accordance with the teachings of this disclosure.

Similar to the process 600, a process 700 by which the device 144 or the ticket server application determines the order in which non-urgent tickets are displayed is illustrated by reference to FIG. 7. At 702, the ticket server application first selects tickets of pause and scheduled task types with a snooze wakeup time that is a first predetermined number (such as sixteen) of minutes old for display. In a further implementation, the ticket server application selects additional tickets based other criteria, such as, for example, user review type and data error type of tickets.

Figure 17:
FIG. 17 is a sample screenshot of a ticket display in accordance with the teachings of this disclosure.

When tickets are displayed on the device 144, the customer service representative 142 can work on a ticket by selecting and opening the ticket. A sample screenshot of a ticket display is illustrated by reference to FIG. 17. The screen 1700 shows, for example, the ticket number, status, type, reason, corresponding restaurant, corresponding order, and corresponding diner. Additionally, the screen 1700 allows the representative 142 to contact the corresponding restaurant and/or diner, compensate the corresponding diner according to a diner credit policy, adjust the corresponding order, adjust the corresponding restaurant, and update the ticket. For example, to compensate a diner, the representative 142 sets an amount of money, such as ten dollars, and/or selects a reason (e.g., delivery/restaurant problem) for such compensation.

As an additional example, the representative 142 can set a snooze wakeup time for the ticket. In such a case, the change to the ticket is sent to the ticket server application at 420. In such a case, the ticket is expected to be handled when the snooze wakeup time arrives. When a change is made to the ticket, the software application running on the device 144 sends the update to the ticket server application which subsequently stores the update into the database 104. Furthermore, the ticket server application may perform additional functions in response to the update or a request. For example, when the representative 142 requests to pause the corresponding restaurant by click a "Pause Restaurant" button on the screen 1700, process 800 (illustrated by reference to FIG. 800) performed by the ticket server application or the restaurant server application.

Figure 8:
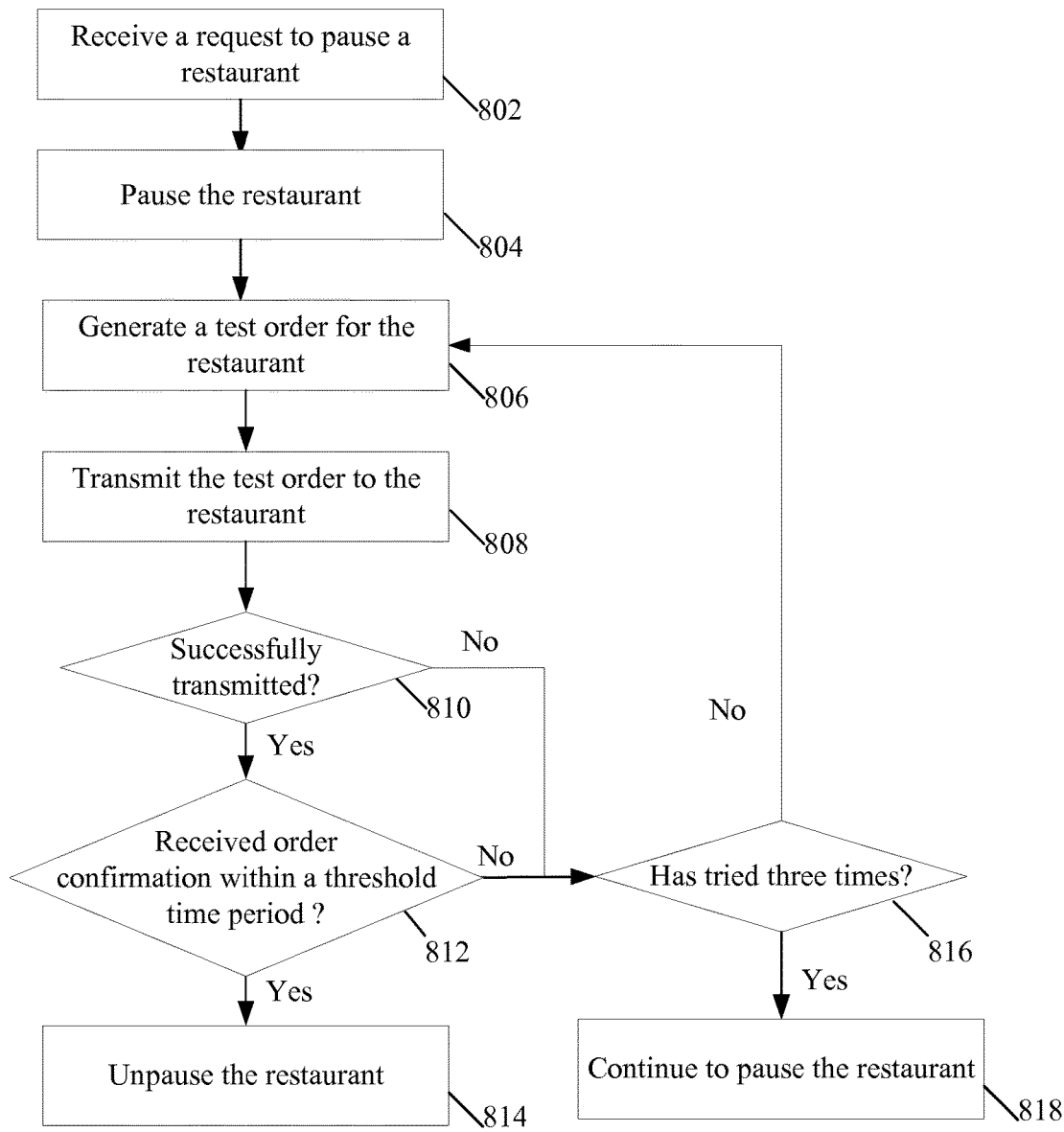
FIG. 8 is a flowchart depicting a process by which a restaurant server application pauses a restaurant in accordance with the teachings of this disclosure.

Turning now to FIG. 8, at 802, the restaurant server application receives a request to pause a restaurant. In one implementation, the restaurant server application retrieves the request, stored into the database 104 by the ticket server application, from the database 104. In a different implementation, the restaurant server application receives the request from the ticket server application. At 804, the restaurant server application pauses the restaurant by marking the restaurant as unavailable to diners. In one implementation, the restaurant server application makes a data change to the restaurant in the database 104

Once the restaurant is paused, the restaurant server application or a background process may continue to check whether the restaurant is reachable. If so, the restaurant server application unpauses the restaurant, i.e., the restaurant server application changes the status of the restaurant from paused to unpaused or normal. Accordingly, the restaurant becomes available for diners to place orders. To do so, at 806, the restaurant server application generates a test order for the restaurant. A test order, which is different from a normal order placed by a diner, is used to check whether a restaurant can successfully receive and confirm orders. The restaurant is not expected to prepare food for test orders. Examples of a test order can be found in U.S. application Ser. No. 13/227,771, which was previously incorporated by reference.

At 808, the restaurant server application attempts to transmit the test order to the restaurant. At 810, the restaurant server application checks whether the transmission was successful. If so, at 812, the restaurant server application detects whether it has received an order confirmation from the restaurant for the test order within a threshold time (such as three or five minutes). If so, at 814, the restaurant server application unpauses the restaurant. Turning back to 810 and 812, where the restaurant server application did not successfully transmit the test order or receive an order confirmation for the test order within the threshold time from the restaurant, at 816, the restaurant server software application checks whether it has tried to send the test order to the restaurant a predetermined number of times (such as three). If so, at 818, the restaurant server application continues to pause the restaurant by not changing status of the restaurant. Otherwise, at 806, the restaurant server application generates a test order again.

Figure 9:
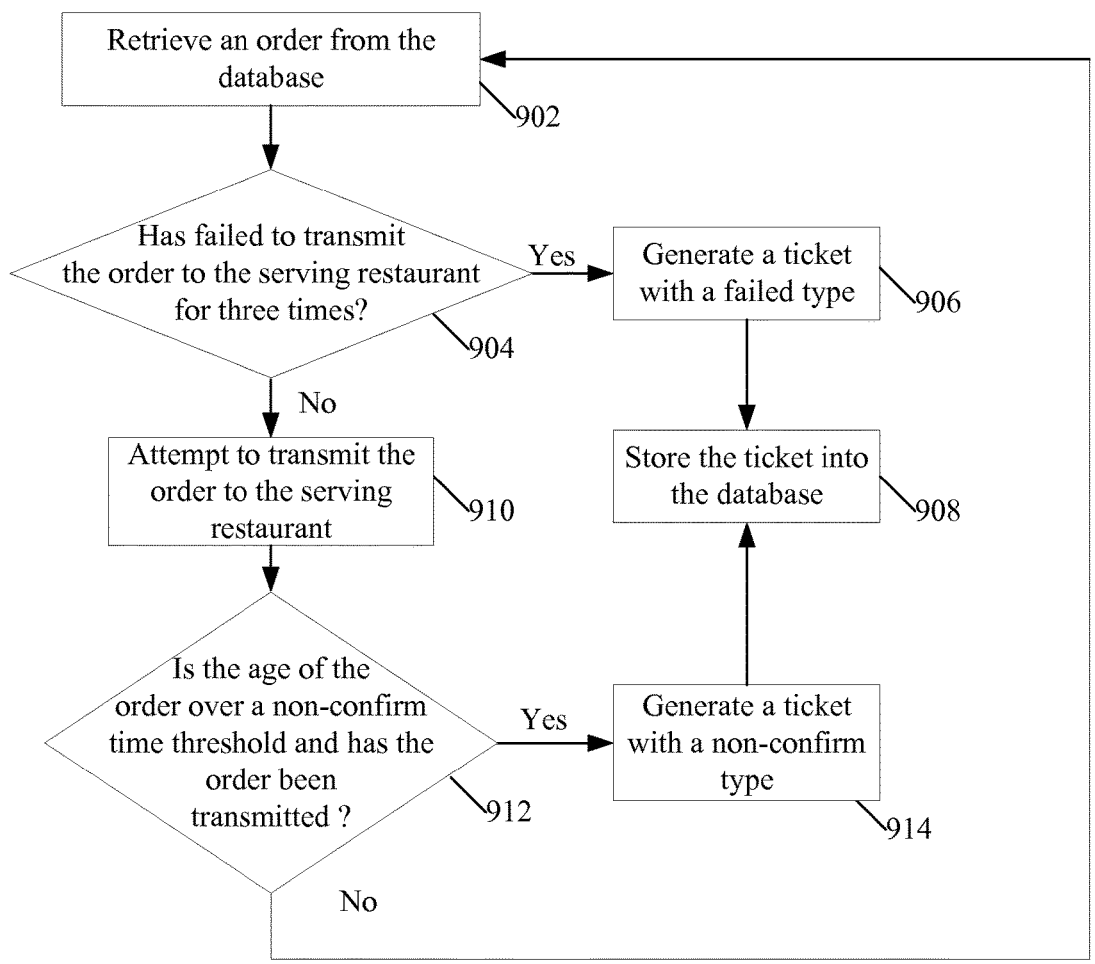
FIG. 9 is a flowchart depicting a process by which a restaurant server application generates a customer service ticket in accordance with the teachings of this disclosure.

Tickets are generated under various conditions by one or more devices within the customer service management system 100. Turning now to FIG. 9, a process 900 by which the restaurant server application generates a ticket is shown. At 902, a restaurant server application retrieves an order from the database 104. At 904, the restaurant server application checks whether it has failed to transmit the order to the serving restaurant of the order a predetermined number of times (such as three). If so, at 906, the restaurant server application generates a ticket with a failed type and associates the ticket with the order. For example, the restaurant server application configures the data structure 1600 for the ticket with information of the order, such as order ID and the serving restaurant of the order. At 908, the restaurant server application stores the generated ticket into the database 104.

Turning back to 904, if the restaurant server application has not failed to transmit the order to the serving restaurant for a threshold amount of times, at 910, the restaurant server application attempts to transmit the order to the serving restaurant again. At 912, the restaurant server application checks whether the age of the order is over a non-confirm time threshold (such as ten or fifteen minutes) and the order has been transmitted to the serving restaurant. If so, at 914, the restaurant server application generates a ticket with a non-confirm type and associates the ticket with the order. Otherwise, the restaurant server application processes the next order at 902.

Figure 10:
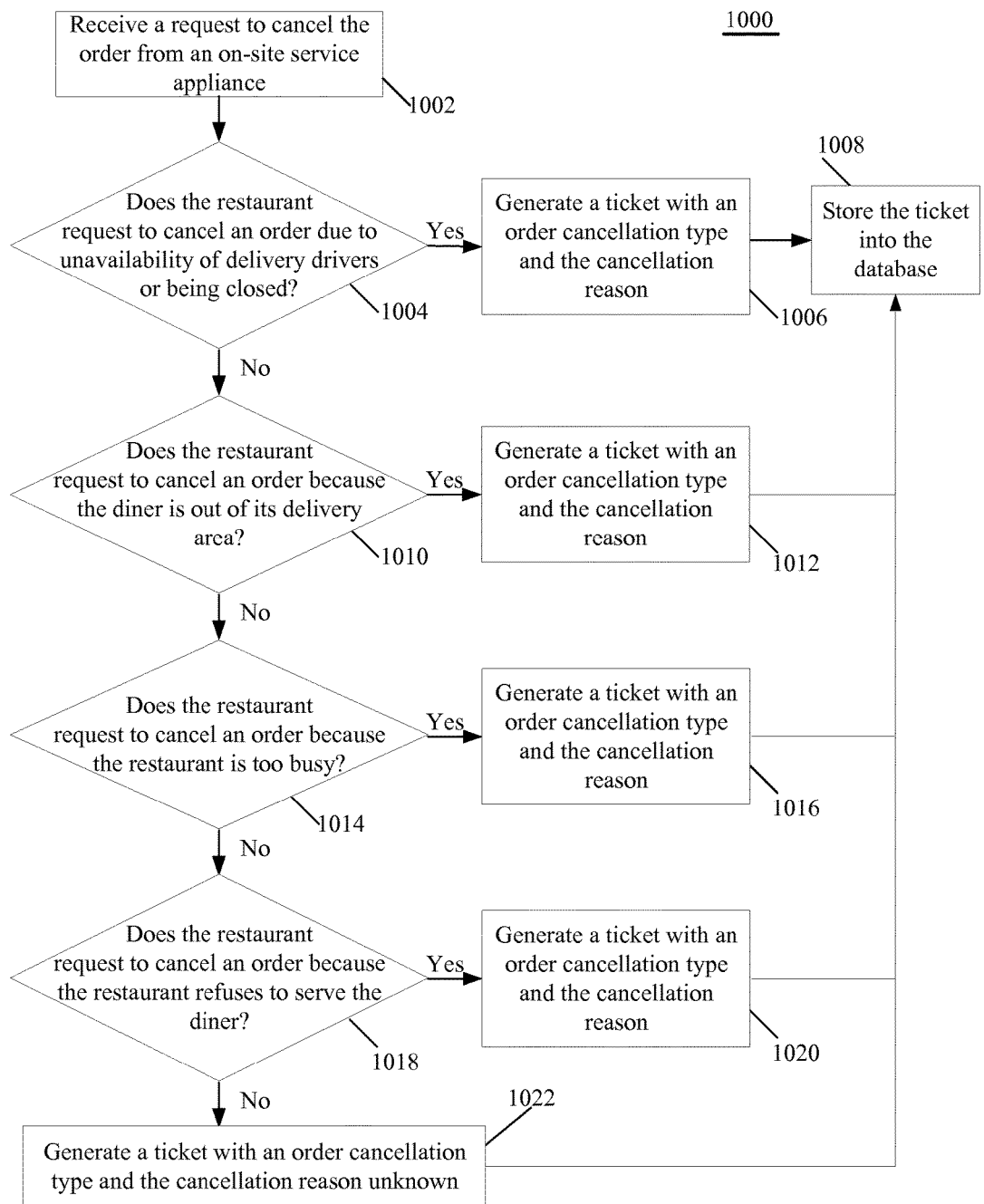
FIG. 10 is a flowchart depicting a process by which a restaurant server application generates a customer service ticket in response to a cancellation request from a restaurant in accordance with the teachings of this disclosure.

The restaurant server application also generates a ticket when the restaurant requests to cancel the order. Turning now to FIG. 10, at 1002, the restaurant server application receives a request to cancel the order from the appliance 36. At 1004, the restaurant server application checks whether the restaurant requests to cancel an order due to unavailability of delivery drivers or the restaurant being closed. If so, at 1006, the restaurant server application generates a ticket with an order cancellation type and the cancellation reason being unavailability of delivery drivers or the restaurant being closed. At 1008, the restaurant server application stores the ticket into the database 104. Turning back to 1004, if the cancellation reason is not unavailability of delivery drivers or the restaurant being closed, at 1010, the restaurant server application checks whether the restaurant requests to cancel an order because the diner is out of its delivery area. If so, at 1012, the restaurant server application generates a ticket with an order cancellation type and the cancellation reason being out of delivery area.

Otherwise, at 1014, the restaurant server application checks whether the restaurant requests to cancel an order because the restaurant is too busy. If so, at 1016, the restaurant server application generates a ticket with an order cancellation type and the cancellation reason being that the restaurant is too busy. Otherwise, at 1018, the restaurant server application checks whether the restaurant requests to cancel an order because the restaurant refuses to serve the diner. If so, at 1020, the restaurant server application generates a ticket with an order cancellation type and the cancellation reason being that the restaurant refuses to serve the diner for some reason. Otherwise, at 1022, the restaurant server application generates a ticket with an order cancellation type and the cancellation reason unknown.

Figure 11:
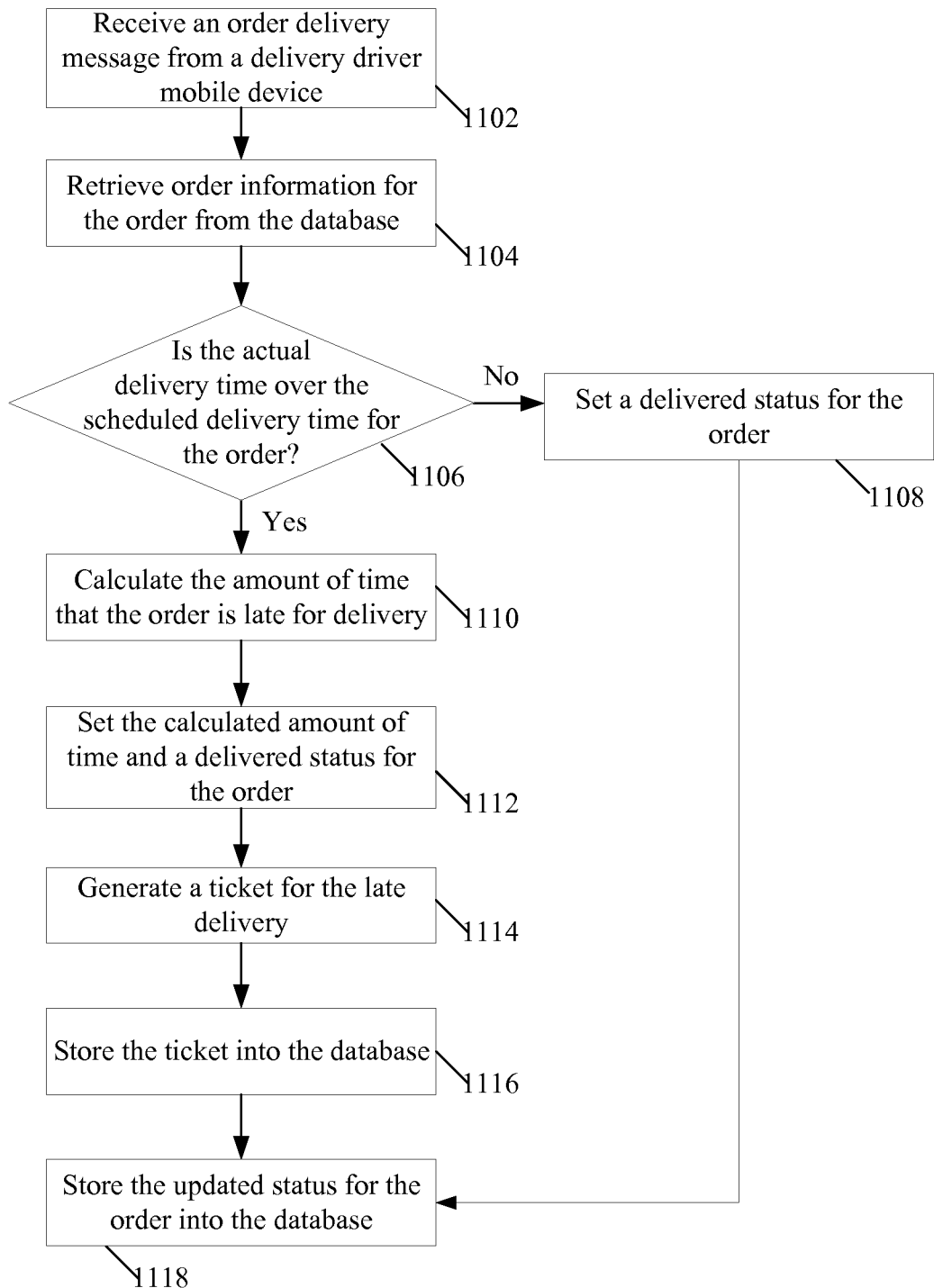
FIG. 11 is a flowchart depicting a process by which a driver server application generates a customer service ticket in response to a late delivery of an order in accordance with the teachings of this disclosure.

A process by which the driver server application generates a ticket is illustrated by reference to FIG. 11. At 1102, a driver server application receives an order delivery message from the delivery driver mobile device 122. At 1104, the driver server application retrieves order information for the delivered order from the database 104. At 1106, the driver server application checks whether the actual delivery time is over the scheduled delivery time for the order. If not, at 1108, the driver server application sets a delivered order status for the order and stores the status into the database 104. Additionally, at 1118, the driver server application stores the updated status for the order into the database 104.

Turning back to 1106, if the delivery is late, at 1110, the driver server application calculates the amount of time that the order is late for delivery. At 1112, the driver server application sets the calculated amount of time and a delivered status for the order and saves the update for the order into the database 104. At 1114, the driver server application generates a ticket for the late delivery with a late order type and the delayed delivery time amount. At 1116, the driver server application stores the ticket into the database 104. At 1118, the driver server application stores the updated status for the order into the database 104.

Like the driver server application, the order server application may also generate tickets. For example, when a diner reports a data error on a restaurant's menus while she is placing an order, the order server application receives the data error report and generates a ticket of data error type. Additionally, the order server application stores the ticket into the database 104.

The customer service management system 100 further allows the customer service support representative 142 to issue diner credits to diners. For example, when a restaurant cancels an order or the order is late for delivery, using the device 144 and restaurant service server 140, the representative 142 may issue a diner credit to the diner for the order by adding a certain amount of money to the diner's account. The diner can use the amount of money, such as five or ten dollars, in the diner's account to place her next order. Diner credits may also be automatically processed by the restaurant service server 140. For example, the restaurant service server 140 programmatically checks tickets and issues diner credits for various reasons, such as late delivery or cancellation. Issuance of diner credits is governed by one or more diner credit policies. An illustrative diner credit policy 1200 for late orders is illustrated by reference to FIG. 12.

The diner credit policy 1200 is shown as a table, which includes a minimum late time column 1202, a maximum late time column 1204, a minimum credit amount column 1206, and a maximum credit amount column 1208. The illustrative diner credit policy 1200 includes three diner credit rules

1210,1212,1214. For the diner credit rule 1210, the diner credit amount that can be issued when an order is late less than T1 minutes, is between x dollars and xx dollars. As used herein, each of the symbols T1, T2, T3, x, xx, y, yy, z and zz represents a number, such as 1, 4.3, 11.6 or 40. Similarly, for the diner credit rule 1212, the diner credit amount that can be issued when the order is late between T1 and T2 minutes, is between y dollars and yy dollars. Where the order is late between T2 and T3 minutes, the diner credit amount that can be issued is between z dollars and zz dollars. The representative 142 may have some discretion as to how much diner credit amount to issue when the order is delivered for more than T2 or T3 minutes late. Alternatively, the diner credit amount to issue is proportional to how much time the order is late beyond T2 or T3 minutes.

Figure 13:
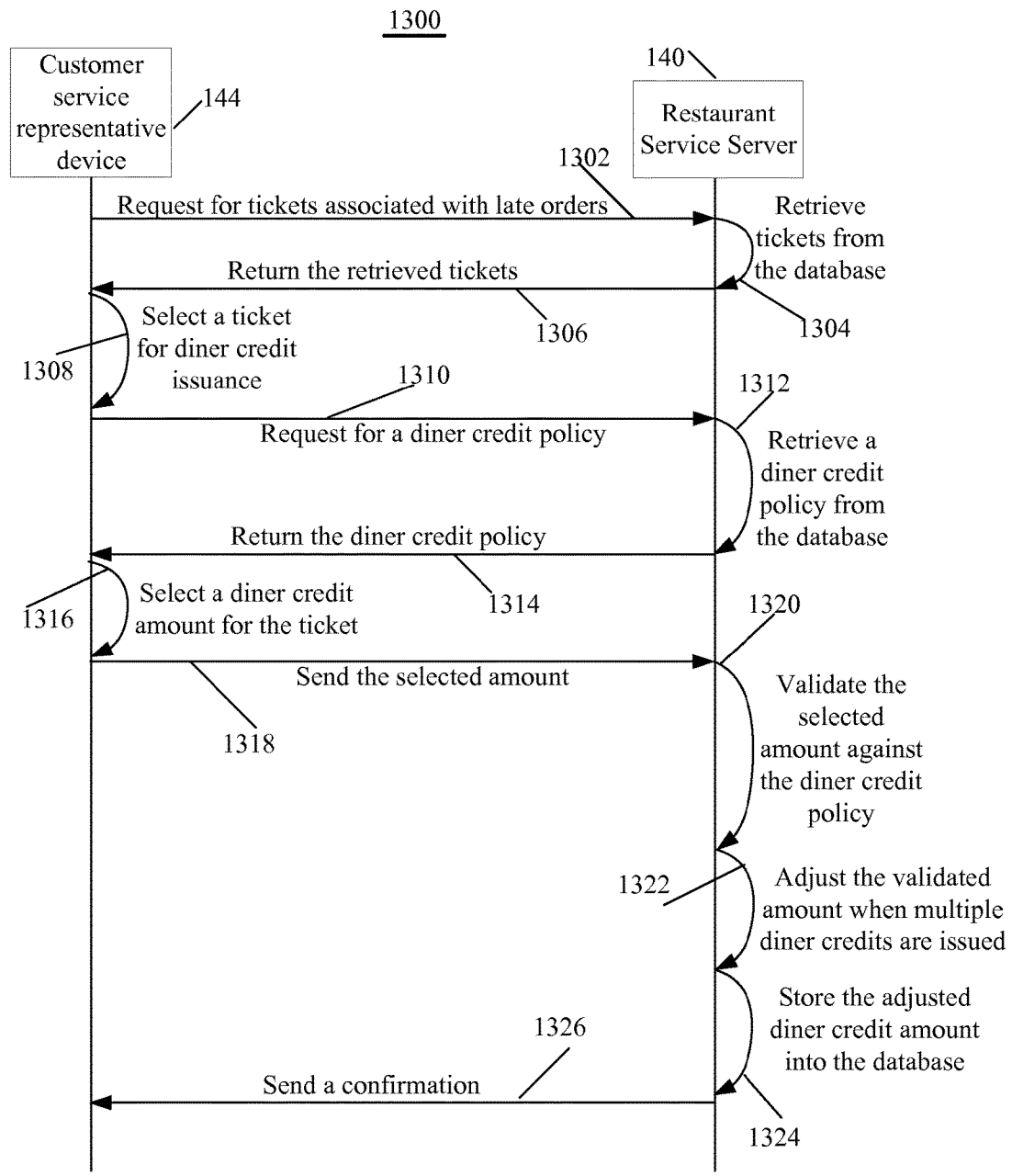
FIG. 13 is a sequence diagram depicting a process by which a restaurant service server issues a diner credit to a diner for a late order in accordance with the teachings of this disclosure.
Figure 15:
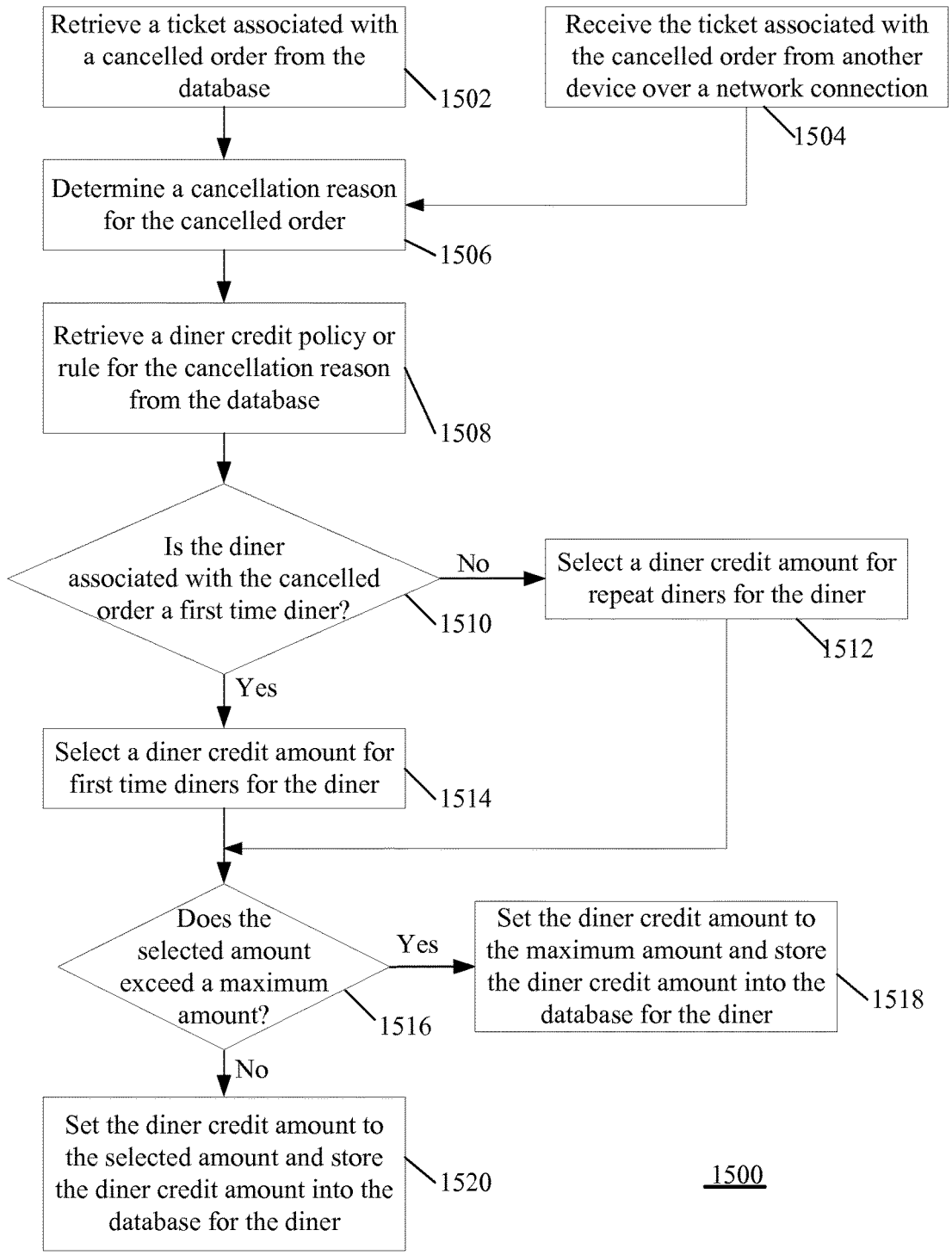
FIG. 15 is a flowchart depicting a process by which a restaurant service server issues a diner credit to a diner for order cancellation in accordance with the teachings of this disclosure.

In one implementation, the diner credit policy 1200 is applied by the customer service representative device 144 and the restaurant service server 140, as illustrated by reference to a sequence diagram 1300 in FIG. 13. At 1302, the device 144 sends a request for tickets associated with late orders to the restaurant service server 140. At 1304, the ticket server application or a different server application running on the server 140 retrieves tickets associated with late orders from the database 104. At 1306, the ticket server application sends the requested tickets back to the device 144. Responsive to a ticket selection by the representative 142, at 1308, the device 144 selects a ticket for diner credit issuance. At 1310, the device 144 sends a request for a diner credit policy to the ticket server application. The ticket server application retrieves a diner credit policy (such as the policy 1200) from the database at 1312, and returns the diner credit policy to the device 144 at 1314. Alternatively, the device 144 requests for the diner credit policy before or after it requests for tickets at 1302.

At 1316, based on the amount of time that the order associated with the selected ticket is late, the device 144 selects and sets a diner credit amount for the ticket. For example, when the amount of time that the order is late is ten minutes, the diner credit amount would be five dollars in accordance with the policy 1200. At 1318, the device 144 sends the selected diner credit amount to the ticket server application. Responsively, at 1320, the server validates the selected diner credit amount against the diner credit policy to ensure compliance with the diner credit policy. For example, the selected amount has to be in compliance with the gift policy.

Multiple diner credits may be issued for a single ticket. For example, a ticket may be thirty five minutes late. Under the policy 1200, the diner for the order should be issued a diner credit with ten dollars. However, the diner may have been already issued a diner credit with five dollars when the ticket was late for less than thirty minutes. In such a case, only the difference between five dollars and ten dollars, i.e., five dollars, should be added to the already issued diner credit. The total diner credit amount for the diner should be ten dollars, instead of fifteen dollars or one diner credit with five dollars and another diner credit with ten dollars. Accordingly, at 1322, the ticket server application adjusts the validated amount when multiple diner credits are issued for a ticket. At 1324, the ticket server application stores the adjusted diner credit amount (or the validated amount when no adjustment is made) into the database 104. Furthermore, at 1326, the ticket server application sends a confirmation message indicating the issuance of the diner credit to the device 144.

A different diner credit policy 1400 for order cancellation is illustrated by reference to FIG. 14. The diner credit policy 1400 is illustrated as a table that includes a cancellation reason column 1402, a diner credit amount for first time diners column 1404, and a diner credit amount for repeat diners column 1406. The cancellation reason column 1402 indicates the reason for cancellation of an order. The example diner credit policy 1400 includes a diner credit rule 1408. The cancellation reason 1402 for the rule 1408 is that a restaurant requests to cancel an order because there are no delivery drivers available for delivering the order. In such a case, the diner for the order can be issued a diner credit with m (a number, such as 2 or 9.5) dollars if it is the first time that the diner used the restaurant service to place the order. Where it is not the first time that the diner used the restaurant service to place the order, the diner can be issued a diner credit with mm (a number, such as 4 or 7.6) dollars. In a further implementation, the diner credit policy 1400 includes additional diner credit rules. These additional diner credit rules are applicable where, for example, the restaurant server application cannot contact the serving restaurant for an order to successfully transmit the order to the restaurant, the meal for the order is unavailable and the restaurant server application or the restaurant 35 cannot contact or reach the diner, diner is out of the restaurant's delivery area, the restaurant is too busy, various issues occur with the restaurant service, or the restaurant refuses to serve the diner for certain reasons.

A process 1500 by which the restaurant service server 1400 issues a diner credit to a diner for order cancellation under the diner credit policy 1400 is illustrated by reference to FIG. 1500. In a different implementation, the functionality of the process 1500 is collectively performed by the device 144 and the restaurant service server 140. At 1502, the ticket server application retrieves a ticket associated with a cancelled order from the database 104. Alternatively, at 1504, the ticket server application receives the ticket from another device (such as the restaurant server application) over a network connection. At 1506, the ticket server application determines a cancellation reason for the cancelled order, such as the cancellation reasons illustrated in FIG. 14. At 1508, the ticket server application retrieves a diner credit policy or rule (such as the gift policy 1400 or diner credit rules 1408,1410,1412,1414,1416,1418,1420,1422) for the cancellation reason from the database 104. At 1510, the ticket server application checks whether the diner associated with the cancelled order is a first time diner of the restaurant service. If so, at 1514, the ticket server application selects a diner credit amount (such as ten dollars under the diner credit rule 1412) that is intended for first time diners for the diner.

Otherwise, at 1512, the ticket server application selects a diner credit amount (such as five dollars under the diner credit rule 1412) that is intended for repeat diners for the diner. At 1516, the ticket server application checks whether the selected diner credit amount exceeds a maximum amount (such as ten or twenty dollars). If so, at 1518, the ticket server application sets the diner credit amount to the maximum amount and stores the diner credit into the database 104. Otherwise, at 1520, the ticket server application sets the diner credit amount to the selected amount and stores the diner credit into the database 104.

For various reasons, such as shortage of ingredients, the restaurant 35 may want to make a menu item unavailable for selection to place orders by diners. In such a case, the restaurant 35 sends a request to black out the menu item to the restaurant service. In one implementation, the restaurant 35 places a telephone call or sends a fax to a customer service representative to request a blackout of the menu item. Alternatively, the restaurant 35 using, for example, the on-site service appliance to send an email or application message to the restaurant service server 140 requesting to black out the menu item. The blackout request can be handled immediately and automatically by a server application, such as the restaurant server application. In a different embodiment, in response to the blackout request, the restaurant server application generates a customer service ticket of the callback blackout item type, and stores the ticket into the database 104. Subsequently, a server application, such as the restaurant server application or the ticket server application, retrieves the blackout request from the database 104 and handles it as described by reference to FIG. 18.

Figure 18:
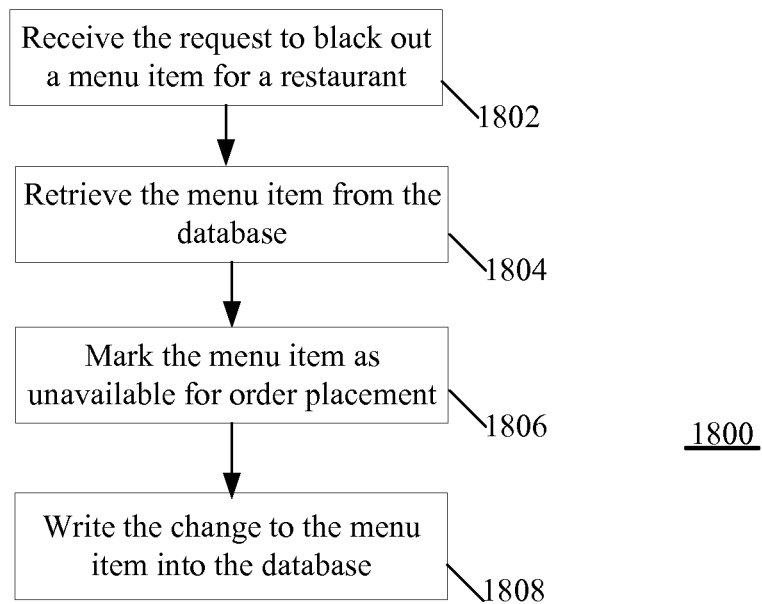
FIG. 18 is a flowchart depicting a process by which a restaurant service server blacks out a menu item for a restaurant to prevent order placement on this menu item in accordance with the teachings of this disclosure.

Referring to FIG. 18, at 1802, the restaurant server application retrieves the request to black out the menu item for the restaurant 35. At 1804, the restaurant server application retrieves the menu item and/or the corresponding menu from the database 104. At 1806, the restaurant server application marks the menu item as unavailable to order placement. Subsequently, at 1808, the restaurant server application writes the change to menu item back into the database 104. Alternative approaches to black out the menu item can be employed. For example, the restaurant server application may delete the menu item from the database 104.

Obviously, many additional modifications and variations of the present disclosure are possible in light of the above teachings. Thus, it is to be understood that, within the scope of the appended claims, the disclosure may be practiced otherwise than is specifically described above. For example, the functionality of the restaurant service server 140 can be performed by multiple physical servers, such as a ticket server, a restaurant server, an order server and a driver server. In one embodiment, the ticket server application, the restaurant server application, the order server application and the driver server application are hosted on a ticket server, a restaurant server, an order server and a driver server respectively.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below.

What is claimed is:

1. A customer service system for managing made-to-order food tickets for a restaurant service comprising:
   i) a restaurant service server including a software application;
   ii) the software application adapted to retrieve a ticket from a database, the ticket generated by a restaurant service server application of the restaurant service;
   iii) the software application adapted to determine a type and a category of the ticket, wherein the type comprises a non-confirmation type, and wherein the category comprises an urgent category, a non-urgent category, or a general service category;
   iv) the software application adapted to retrieve a set of customer service time thresholds for the ticket;
   v) based on the type and the set of customer service time thresholds, the software application adapted to assign a display order for the ticket within the category;
   vi) the software application adapted to receive a status update for the ticket over a network connection; and
   vii) the software application adapted to store the status update for the ticket into the database.

2. The system of claim 1 wherein the ticket is generated in response to a failure to transmit an order to a restaurant or confirm the order by the restaurant.

3. The system of claim 2 wherein the restaurant service server is adapted to:
   i) pause a communication status of the restaurant by indicating restaurant unavailability;
   ii) generate a test order and send the test order to the restaurant for confirmation by the restaurant;
   iii) where the test order is successfully confirmed by the restaurant, unpause the communication status of the restaurant by indicating restaurant availability; and
   iv) where the test order is not successfully confirmed by the restaurant, continue to pause the communication status of the restaurant by indicating restaurant unavailability.

4. The system of claim 1 wherein the restaurant service server is adapted to black out a menu item from a restaurant.

5. The system of claim 1 wherein the ticket is generated in response to a message sent over a wide area network from an on-site service appliance or a delivery driver mobile device.

6. The system of claim 1 wherein the type of the ticket further comprises is one of a non-confirmation type, a failed type, a callback blackout item type, a callback order issue type, a callback technical issue type, an order cancellation type, a late order type, a user review type, a data error type, a pause restaurant type, or a scheduled task type.

7. The system of claim 1 wherein the set of customer service time thresholds comprises a snooze wake up time threshold and wherein the software application is adapted to set the snooze wake up time threshold.

8. The system of claim 1 wherein the set of customer service time thresholds comprises an order time threshold and wherein the software application is adapted to set the order time threshold.

9. The system of claim 1 wherein the set of customer service time thresholds comprises a ticket time threshold and wherein the software application is adapted to set the ticket time threshold.

10. The system of claim 1 wherein the software application retrieves the ticket from the database through a different server.

* * * * *